US011265618B2

United States Patent
Novick et al.

(10) Patent No.: US 11,265,618 B2
(45) Date of Patent: Mar. 1, 2022

(54) METHOD AND APPARATUS FOR OPTIMIZING ADVERTISEMENT PLACEMENT

(71) Applicant: Fox Latin American Channel LLC, Los Angeles, CA (US)

(72) Inventors: Daniela E. Novick, Palmetto Bay, FL (US); Juan C. Vallejo, Miami, FL (US)

(73) Assignee: TFCF LATIN AMERICAN CHANNEL LLC, Los Angeles, CA (US)

(*) Notice: Subject to any disclaimer, the term of this patent is extended or adjusted under 35 U.S.C. 154(b) by 0 days.

(21) Appl. No.: 16/957,366

(22) PCT Filed: Feb. 1, 2019

(86) PCT No.: PCT/US2019/016420
§ 371 (c)(1),
(2) Date: Jun. 23, 2020

(87) PCT Pub. No.: WO2019/152890
PCT Pub. Date: Aug. 8, 2019

(65) Prior Publication Data
US 2020/0336800 A1  Oct. 22, 2020

Related U.S. Application Data

(60) Provisional application No. 62/669,189, filed on May 9, 2018, provisional application No. 62/656,258, filed (Continued)

(51) Int. Cl.
*H04N 21/81* (2011.01)
*H04N 21/442* (2011.01)

(52) U.S. Cl.
CPC ..... *H04N 21/812* (2013.01); *H04N 21/44213* (2013.01)

(58) Field of Classification Search
CPC .............................. G06F 15/16; G06Q 30/02
See application file for complete search history.

(56) References Cited

U.S. PATENT DOCUMENTS 8,966,520 B2    2/2015  Tom et al.
9,092,757 B2 *  7/2015  Antin ..................... G06Q 10/10
(Continued)

OTHER PUBLICATIONS

International Search Report, dated Apr. 29, 2019, in PCT Application Serial No. PCT/US2019/016420.
(Continued)

*Primary Examiner* — Jefferey F Harold
*Assistant Examiner* — Timothy R Newlin
(74) *Attorney, Agent, or Firm* — Farjami & Farjami LLP

(57) ABSTRACT

A system and method for scheduling at least one advertisement for presentation in connection with at least one media program is presented. In one embodiment, the method comprises determining a measure of engagement of at least a portion of the at least one media program, selecting the at least one advertisement from the plurality of advertisements based at least in part upon the determined measure of engagement of the at least a portion of the media program, and scheduling the selected advertisement for presentation in connection with the selected at least one advertisement.

18 Claims, 17 Drawing Sheets

Related U.S. Application Data on Apr. 11, 2018, provisional application No. 62/625,935, filed on Feb. 2, 2018.

(56) References Cited

U.S. PATENT DOCUMENTS

| | | | |
|---|---|---|---|
| 9,213,984 B2 | 12/2015 | Karlsson et al. | |
| 9,596,514 B2 | 3/2017 | Kilar et al. | |
| 2009/0083631 A1* | 3/2009 | Sidi | H04N 21/254 |
| | | | 715/721 |
| 2009/0199107 A1* | 8/2009 | Lewis | G06Q 30/0269 |
| | | | 715/745 |
| 2011/0208585 A1* | 8/2011 | Daboll | G06Q 30/0255 |
| | | | 705/14.53 |
| 2013/0205314 A1* | 8/2013 | Ramaswamy | H04N 21/44218 |
| | | | 725/14 |
| 2013/0232515 A1* | 9/2013 | Rivera | G06Q 30/02 |
| | | | 725/12 |
| 2014/0278308 A1* | 9/2014 | Liu | H04L 67/22 |
| | | | 703/6 |
| 2014/0282725 A1* | 9/2014 | Brandstetter | H04N 21/4882 |
| | | | 725/36 |
| 2014/0330132 A1* | 11/2014 | Raskin | A61B 5/0077 |
| | | | 600/479 |
| 2014/0337868 A1* | 11/2014 | Garza | H04N 21/4532 |
| | | | 725/12 |
| 2015/0099987 A1* | 4/2015 | Bhatkar | G16H 30/40 |
| | | | 600/479 |
| 2017/0200188 A1* | 7/2017 | Konar | G06Q 30/0245 |
| 2017/0286625 A1* | 10/2017 | Blander | A61B 5/0245 |
| 2018/0032682 A1* | 2/2018 | Donalds | G16H 40/67 |

OTHER PUBLICATIONS

"International Preliminary Report on Patentability (IPRP) in PCT application No. PCT/US2019/016420".

* cited by examiner

METHOD AND APPARATUS FOR OPTIMIZING ADVERTISEMENT PLACEMENT

CROSS-REFERENCE TO RELATED APPLICATIONS

This application is a U.S. national phase application, which is based on, and claims priority from, PCT Application Serial No. PCT/US2019/016420, filed Feb. 1, 2019, which claims benefit of the following U.S. Provisional Patent Applications, each of which is incorporated by reference herein:

U.S. Provisional Patent Application No. 62/625,935, entitled "ENGAGEMENT OPTIMIZER," by Daniela Novick, filed Feb. 2, 2018;

U.S. Provisional Patent Application No. 62,656/258, entitled "METHOD AND APPARATUS FOR OPTIMIZING ADVERTISEMENT PLACEMENT," by Daniela Novick, filed Apr. 11, 2018; and U.S. Provisional Patent Application No. 62/669,189, entitled "METHOD AND APPARATUS FOR OPTIMIZING ADVERTISEMENT PLACEMENT," by Daniela Novick and Juan C. Vallejo, filed May 9, 2018.

BACKGROUND

1. Field

The present disclosure relates to systems and methods for presenting media programs and advertisements, and in particular to a system and method for scheduling advertisements among media programs according to engagement.

2. Description of the Related Art

Broadcast television networks sell advertising time for advertisement opportunities (ad ops) within and in between the media programs they broadcast. Typically, the value of these ad ops is determined by the reach of the appurtenant media program and the demographic it serves. Typically, clients contract to purchase a large number of ad ops for a broadcast season, with a guaranteed total Nielsen rating for the advertisement campaign directed at the desired demographic.

Since the reach and associated demographic of the media program are indicators of the effectiveness of the advertising in terms of desired results (purchase, brand recognition, etc.), ad ops within such media programs are in demand, and are offered at a premium price.

At the same time, while the reach and demographic of a media program are reasonable indicators of the potential effectiveness of advertisements placed within media program, more effective and accurate measures are desired, particularly for media programs with smaller reach, but significant advertising potential, particularly with desired demographics.

What is needed is to a system and method that uses another metric to identify high value ad ops and to schedule advertisements in the identified ad ops. Such a system and method are described below.

SUMMARY

To address the requirements described above, this document discloses a system and method for scheduling at least one advertisement for presentation in connection with at least one media program. In one embodiment, the method comprises determining a measure of engagement of at least a portion of the at least one media program, selecting the at least one advertisement from the plurality of advertisements based at least in part upon the determined measure of engagement of the at least a portion of the media program, and scheduling the selected advertisement for presentation in connection with the selected at least one advertisement. Another embodiment is evidenced by an apparatus for scheduling at least one advertisement for presentation in connection with at least one media program. The apparatus comprises a program receiver for receiving media programs from a program source providing one or more media programs and metadata describing each respective media program, and a scheduler. The scheduler comprises a scheduler processor and a scheduler memory, communicatively coupled to the scheduler processor, and the scheduler memory storing instructions including instructions for determining a measure of engagement of at least a portion of the at least one media program, selecting the at least one advertisement from the plurality of advertisements based at least in part upon the determined measure of engagement of the at least a portion of the media program, and scheduling the selected advertisement for presentation in connection with the selected at least one advertisement. The apparatus further comprises an advertisement inserter, communicatively coupled to the scheduler, for inserting advertisements from an advertisement server in a transmission data stream.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
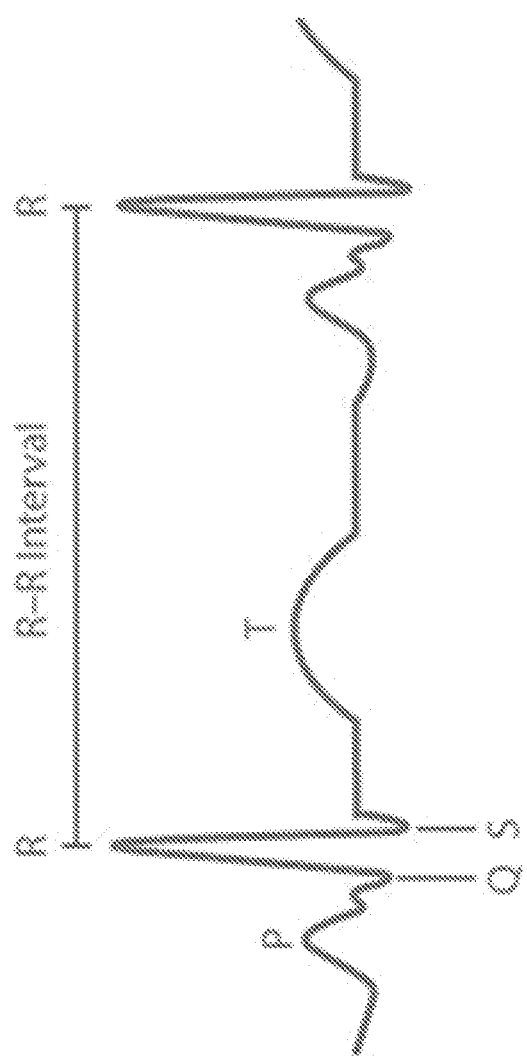
FIG. 1 is a plot of a human heart wave.

In the following description, reference is made to the accompanying drawings which form a part hereof, and which is shown, by way of illustration, several embodiments. It is understood that other embodiments may be utilized, and structural changes may be made without departing from the scope of the present disclosure.

Disclosed below is a system and method for determining user engagement and using measured user engagement in making television programming scheduling decisions, particularly in scheduling advertisements for presentation in conjunction with media programs.

A device similar to a fitness tracker was used to measure a physiological marker of engagement called heart rate variability (HRV) as a proxy for engagement level. This device permits second by second tracking of variation in audience engagement in both laboratory and field study environments and can be used to schedule advertisements in real time.

Such studies have shown unexpected results that are useful when applied in the context of scheduling advertisements to be presented with media programs. One such unexpected result is that no correlation was observed between HRV and television rating. Another unexpected result was the "engagement carryover effect" in which viewers who watch more engaging shows will be more attentive during commercial blocks, controlling for the quality of the commercial message and audience characteristics. These results have considerable application in creating and scheduling advertisements to maximize value for advertisers, because our results indicate higher levels of audience engagement are associated with desirable marketing outcomes such as brand preferences and stated purchase intentions, thus having significantly implications for the effectiveness and pricing of commercial messages on television.

Overview

The television industry has long used two primary dimensions upon which to determine the price of advertisements: show ratings and demographic characteristics. At the same time, the psychological and emotional experience of users viewing advertisements is also important . . . particularly how engaging the commercials are.

Engagement is not only critical for commercial messages but also for regular television programming. More engaging television shows might find a larger audience and remain popular over longer periods of time. In addition, more engaging content is attractive for advertisers if engagement with a show changes the audience's experience of commercials during breaks in a way valuable to the advertiser. Such carryover effects, if they could be shown to exist, would have important consequences for the effective placement of advertisements.

While it is generally understood that audience engagement is important, most such understanding is related on self reported experience and not based on continuous measures. Further, several questions and unknowns remain.

Variation in engagement across difference types of programming and commercial blocks: Because viewers actively select the shows they watch, it is not obvious whether engagement varies substantially. When people watch their favorite content, perhaps their level of engagement ends up being quite similar to each other-because it is their favorite, not necessarily because a show is universally engaging.

Source of the variation: If we observe significant variation in engagement, an important question is the source of this variation. Is it the case that highly engaged viewers are attracted by specific programs? For example, highly engaged individuals might flock to sports shows, creating an association of sports programming and engagement. Or do the programs themselves cause varying levels of engagement?

Is engagement simply a proxy for other commonly used metrics for advertisement placement: If expected engagement drives when and what we watch, it is quite possible that reach and ratings, which are much easier to measure, already reflect engagement.

Measurement of carryover effects: If carryover effects can be shown to exist, how does one measure or estimate the possibility of carryover effects from regular programming to commercial periods. In other words, if we are engaged by what we are watching, are we automatically more engaged by the commercial blocks embedded within the program? This was determined by randomly assigning commercials to channels and programs. This experimental design allowed us to see whether more engagement during regular programming does in fact lead to higher engagement during commercial breaks.

Relationship between engagement and desirable marketing outcomes: Is it the case, for instance, that more engaging commercials lead to more favorable brand preferences and increases in stated purchasing intentions-two self-reported outcome measures widely used in the marketing literature?

Laboratory studies can be used to determine audience engagement and its effect on purchase decisions or brand reputation, but people don't view media programs in laboratory environments, and the environment may have significant impact on engagement measurements and any conclusions reached therefrom. Accordingly, two studies were performed. The first study was performed in a laboratory environment to obtain initial information regarding audience engagement relationship. These results were used to design a field study, using a device similar to a high-quality fitness tracker to measure the HRV of subjects during their regular television viewing over a lengthy period.

Such studies have demonstrated that audience engagement varies significantly across shows and commercials, and that a substantial portion of this variation reflects differences across persons, not differences across programming. Importantly and somewhat surprisingly, engagement was not significantly correlated with audience size or television ratings in our data. Instead, engagement appears to be a dimension of the viewer experience that is not currently captured by established metrics in the television business. Also importantly, there is strong evidence of a substantial carryover effect from regular programming to commercial blocks. An elevated level of engagement during a TV show will increase the audience's engagement during the commercial block. Finally, increased engagement is associated with desirable marketing outcomes.

Engagement

Engagement is understood to be both a cognitive and an emotional experience. It is characterized by an increase in attention as well as heightened psychological and emotional involvement, synchronicity, and "flow". Engaged individuals exhibit higher levels of trust, satisfaction, commitment, and loyalty. When engaged, the self is connected to the target of interest, be it another person, a task at work, and by extension, a television commercial.

The typical measure of engagement in the psychological literature is behavioral. For example, psychologists observe how long a person persists at a difficult task. If a person cannot put a book down or change the channel on a television show, she is engaged. All of these examples highlight the conceptual features of engagement attention, involvement, absorption, flow, positive emotion, and a sense of trust.

Unfortunately, it is not always possible to directly observe behavior of a particular person or target. For example, it is challenging to know how engaged a person is if she watches a short commercial. But there is an alternative. In a branch of psychology called psychophysiology, there is a widely used measure of engagement that is predictive of behavior. That measure is a person's variability in heart rate (HRV). The link between a person's HRV and engagement is straightforward. When we are engaged, we generate emotional responses to our environment. As we adapt to the environment, we transition between states of high and low arousal. More specifically, sympathetic arousal is characterized by an increase in blood pressure and heart rate; parasympathetic arousal does the opposite. In other words, it is the changes in a person's heart rate that indicates engagement and attention.

FIG. 1 is a plot of a human heart wave. We measured these changes as the time that passes from one heartbeat to the next ("labeled R-R interval"). Variation in this R-R interval is psychologically meaningful as an index of social and psychological engagement. The greater the variability, the more engaged a person tends to be. Visual attention, for example, measured by eye-tracking devices, has been shown to be highly correlated to HRV.

Laboratory Studies

Laboratory studies are useful to assess the landscape of the effect of different program materials and advertisements on HRV. They are also useful to determine whether commercially available fitness trackers measure HRV well enough to permit conclusions regarding engagement in a field study atmosphere.

The first study was a laboratory study. The participants saw short segments of three shows and six out of eleven commercials. HRV was measured with electrocardiography equipment, and physiological responses to commercials and shows were captured during their entire duration. To collect HRV data, the experimenter applied sensors to the participant to record cardiovascular responses. Responses were recorded at a rate of 1,000 samples per second using snap electrodes placed on each participant in a standard (left arm, left leg) configuration for ECG recording. After attaching the sensors, physiological signals were collected during a 5-min baseline period during which participants watched a relaxing video of waves crashing. Upon completion of the study, physiological data visually scanned for unusual signals (e.g., movement artifacts) and removed any unusual data prior to scoring. The HRV values reported for the laboratory study study are the natural log of the time that passed between successive heartbeats, averaged over the length of a television segment or a commercial block. Measured HRV values fell between 2 and 9, which are typical.

Prior to observing the shows and commercials, participants first answered a set of questions about the brands included in our study and then watched the paired shows and commercials. After each pair, the participants answered questions about the show and the commercials. At the very end of the experiment, they answered a set of personal and demographic questions.

Participants watched five-minute segments of three different shows and they saw two full-length commercials after each show. We selected the shows and the commercials from a larger set of 18 programs and 29 television spots, choosing content and spots that varied maximally in the expected emotional response of the audience. The sequence of television shows and commercials varied from participant to participant, allowing us to study, for instance, the importance of being the first commercial message after a block of programming.

Laboratory Results

Figure 2:
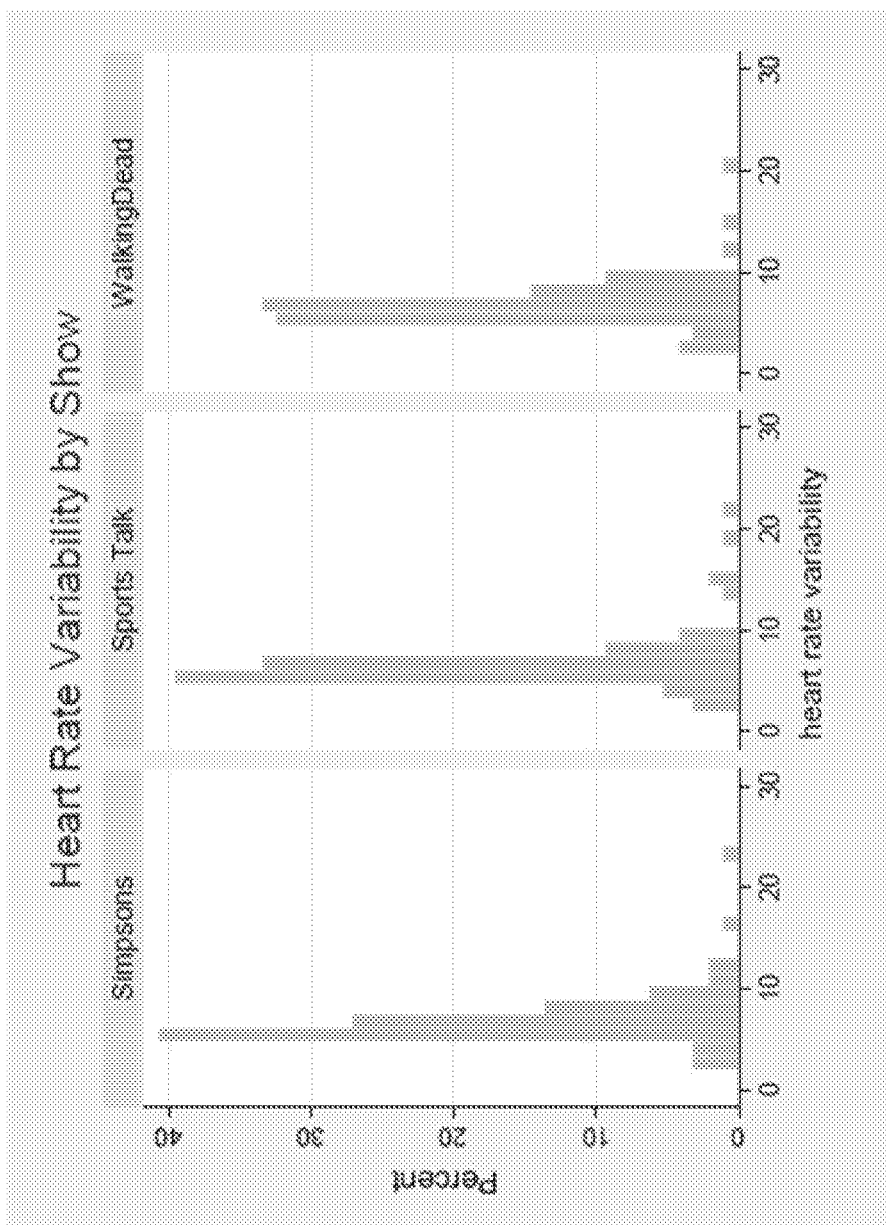
FIG. 2 is a diagram showing histograms of HRV for different media programs.

FIG. 2 is a diagram showing histograms of HRV for different shows. As is illustrated, exposing participants to different shows and commercials clearly had an effect on their HRV, since both the mean and the dispersion of HRV vary by show. Similar results were found with respect to exposing participants to different commercials.

Engagement During Shows

A first issue was whether subjects were particularly engaged during some of the shows than they were for other shows. This was accomplished by determining the effect of watching a specific show on HRV.

Figure 3:
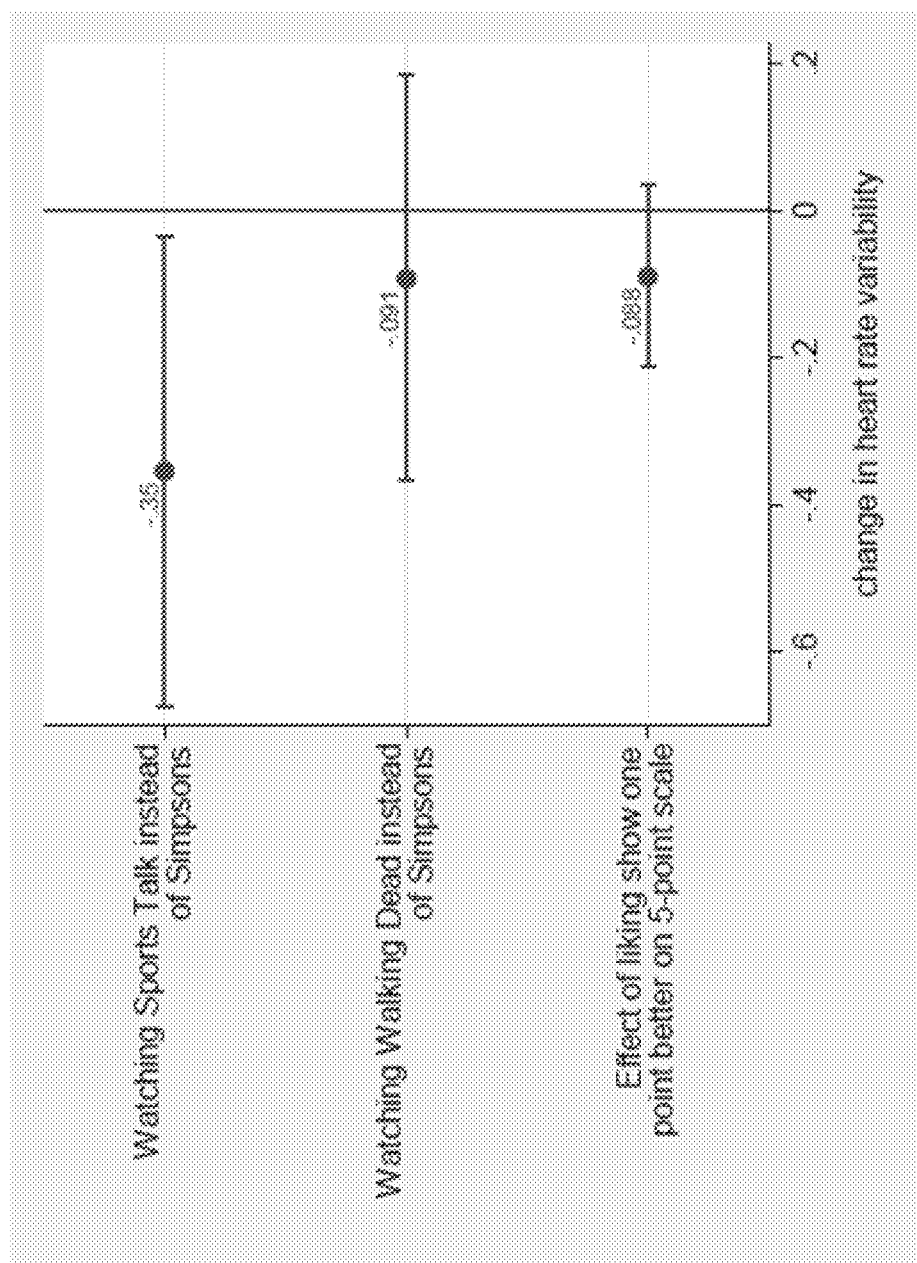
FIG. 3 is a diagram illustrating the change in subjects HRV during a number of media programs.

FIG. 3 is a diagram illustrating the change in subjects HRV during a number of media programs. The dependent variable reflects the subjects' HRV during the show, and capped lines represent the 95% confidence levels. Note that compared to watching the show "The Simpsons," participants were significantly less engaged during La Oltima Palabra. On average, our subjects' HRV declined by 0.35 when they went from watching The Simpsons to watching the sports talk show. There was no statistical difference between The Simpsons and The Walking Dead. Perhaps most interestingly, the self-reported metric of "liking" a show and being physiologically engaged appear to be two different constructs. Subjects who told us that they liked a segment better did not, on average, exhibit greater HRV.

In our estimates of audience engagement, we controlled for our subjects' resting-state HRV, gender and age. Not surprisingly, older people showed lower levels of HRV. Results were controlled for all personality characteristics that do not change during the experiment, even characteristics that cannot be directly observed. These controlled results demonstrated that "liking" a show and being engaged are two different cognitive-emotional states. As before, different shows elicited different levels of engagement; the sports talk show being less engaging in our study.

To further explore the difference between "liking" a show and being engaged, we can ask how the two measures relate to the likelihood of watching a show. After each television segment, we asked subjects how familiar they were with the show. We measured familiarity on a scale from 1 to 5, where 1="never heard of the show", 2="heard of the show, but never watched it", 3="watch(ed) show occasionally", 4="watch(ed) show regularly", 5="Never miss(ed) an episode". We took this measure of familiarity as our proxy for reach and asked whether subjects who like the show better were more likely to watch it.

Figure 4:
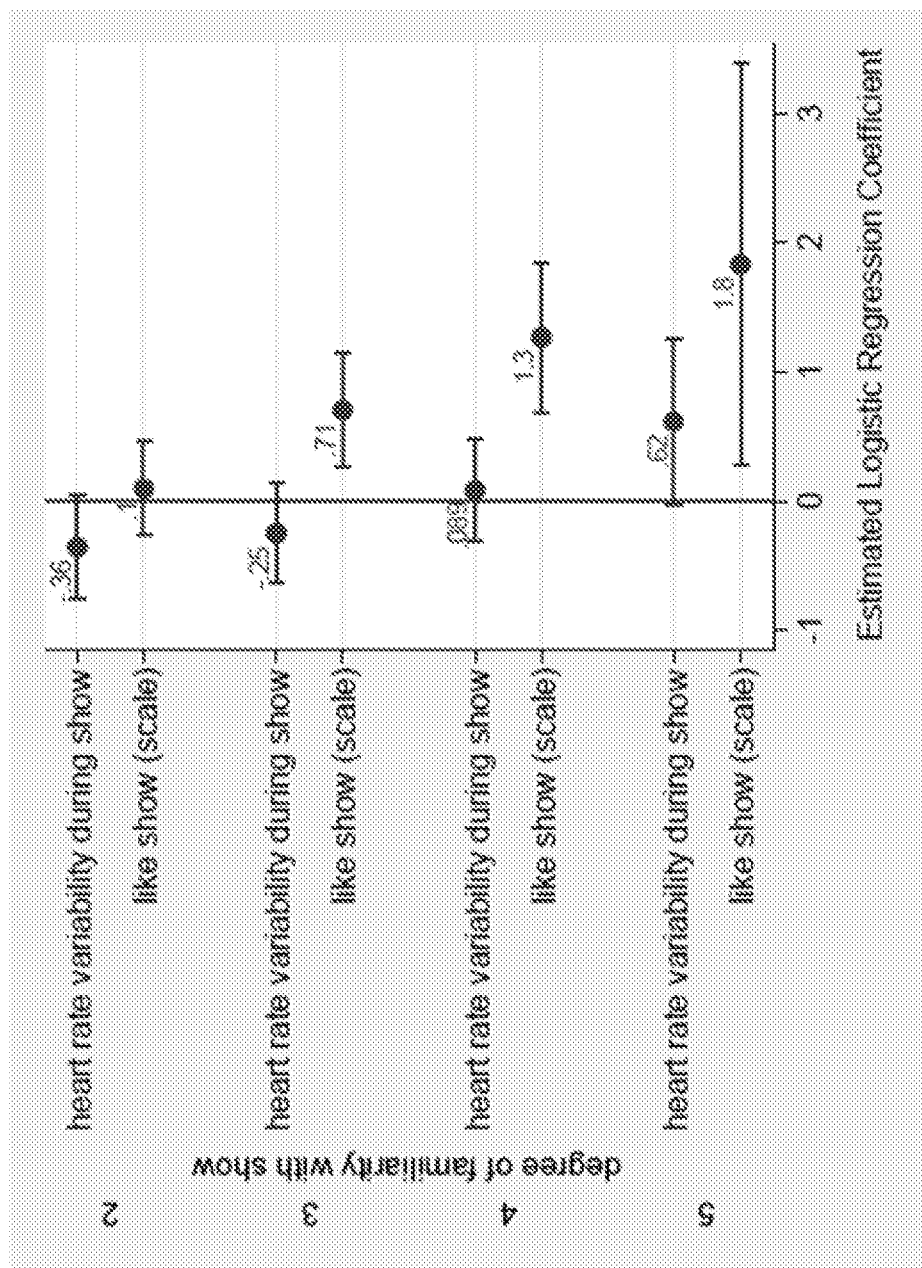
FIG. 4 is a diagram illustrating how audience engagement and "liking" shifted the likelihood that participants watch the three shows intensely.

FIG. 4 is a diagram illustrating how audience engagement and "liking" shifted the likelihood that participants watch the three shows intensely. The dependent variable is familiarity with the show and capped lines represent the 95% confidence intervals. The pattern of results is consistent with our earlier conjecture. The effect of "liking" on familiarity is positive throughout and it increases monotonically in size. In our sample, "liking" the segment of a show is a good proxy for regular viewing. HRV, however, is very different. It essentially bears no relationship with familiarity at low levels of viewing. But when we try to predict who will never miss a show, HRV is a useful measure.

Engagement Watching Commercials

In this section, we analyzed why our subjects had far higher HRV during some advertisements than during others. A first likely influence is the quality of the advertisement itself. For each of our commercials, we know how much our subjects liked it. For the marketing professional, it is particularly important to know whether the environment in which a message is placed has a significant influence on engagement. We used two variables to measure the quality of this environment: how much a subject liked the show that preceded the commercial and the subject's engagement during the show.

Figure 5:
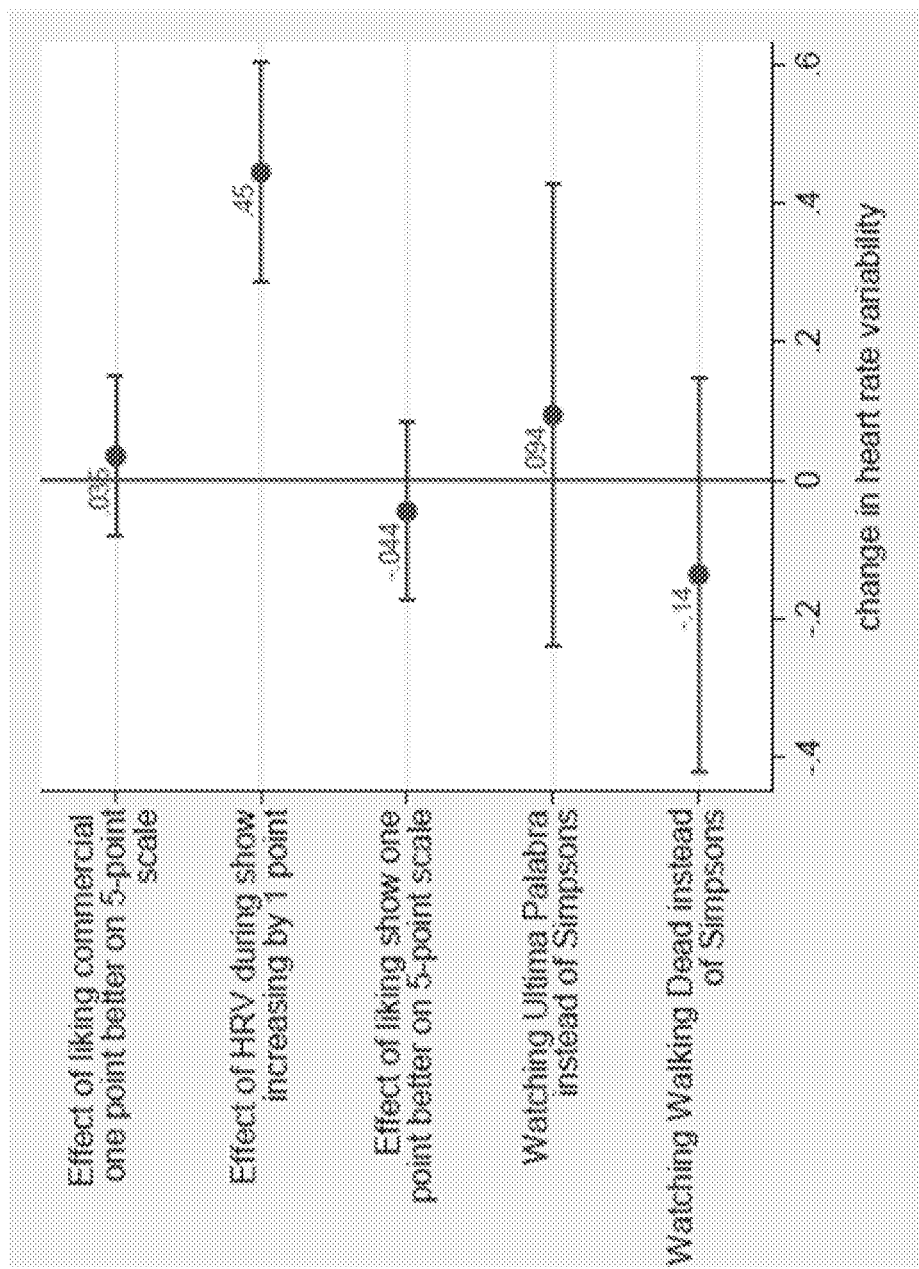
FIG. 5 is a diagram illustrating HRV measurement effects associated with viewing advertisements.
Figure 7:
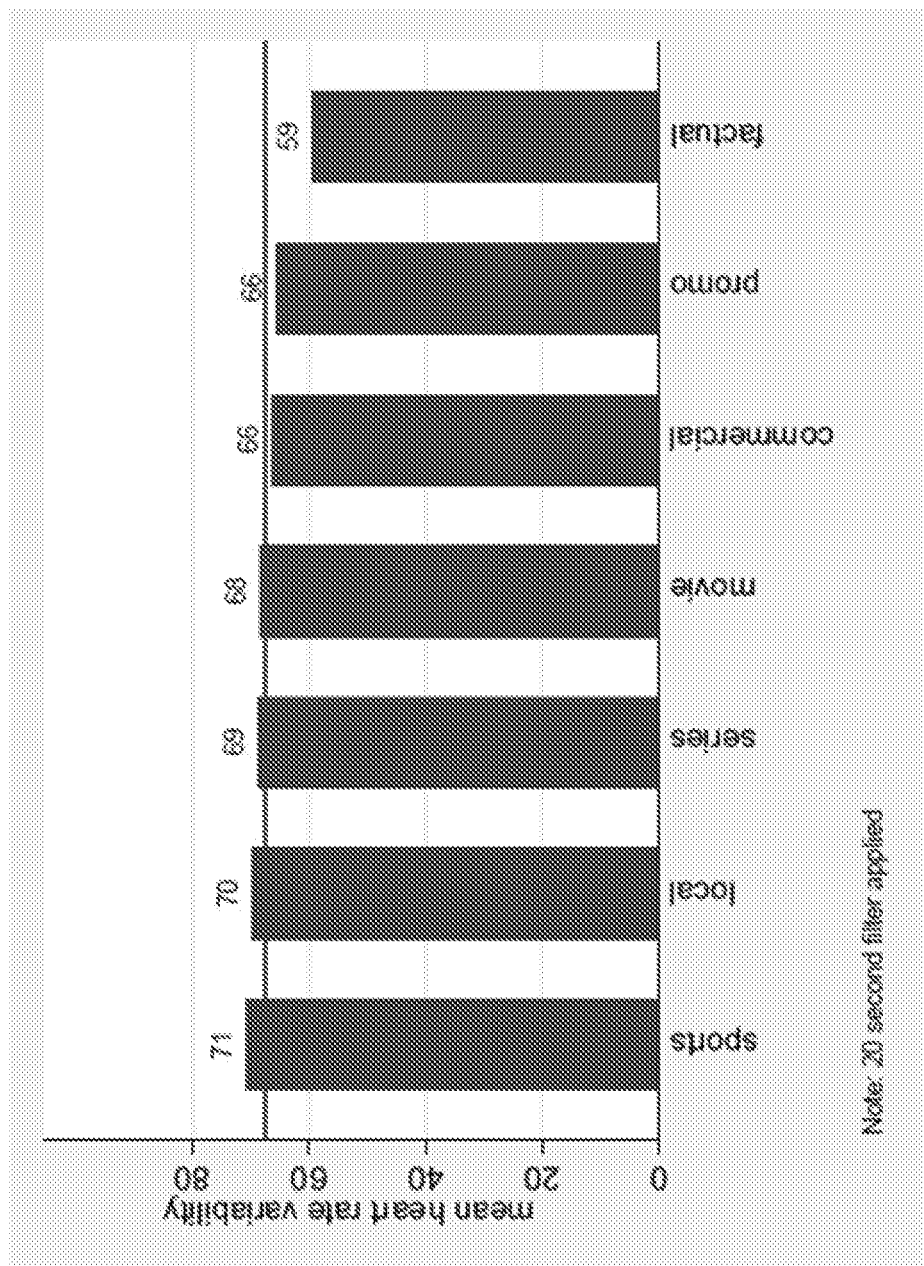
FIG. 7 is a diagram illustrating field study participants' mean HRV across the types of television shows.

FIG. 5 is a diagram illustrating HRV measurement effects associated with viewing advertisements. The dependent variable is the HRV during a television advertisement and the capped lines represent the 95% confidence interval. The results show that engagement during the preceding show was a powerful predictor for engagement during the commercial. For every one-point increase in HRV during the show we find an increase of 0.45 in HRV during the commercial. The estimated coefficient implies that a one-standard-deviation increase in engagement during the show will increase engagement during the commercial by about a third of a standard deviation. The effect is highly significant statistically and economically important. The link in engagement between content and commercials is all the more remarkable because "liking" the show and "liking" the commercial were unrelated to engagement during the commercial as FIG. 7 shows. Results controlled for the preceding show, age and gender. Further, subjects in the test were shown two commercials in the commercial break, to allow the study to determine whether audience engagement was higher during the first advertisement than the second advertisement. Results show that the HRV associated with the advertisement falls during the second commercial, but the effect is economically small and statistically non-significant.

Value of the Engagement Carryover Effect

While it is interesting that engagement with television content predicts viewing frequency and subsequent engagement during blocks of advertising, ultimately marketing professionals care about the effect of engagement on brand perceptions and the likelihood of product purchase. In this section, we will describe how we studied these connections.

We employed four widely-used indices that describe marketing outcomes of interest. "Liking (of product)", "feel warmly (towards product)", "consider using" and "likely to purchase" were all measured on scales from 1-5.

Figure 6:
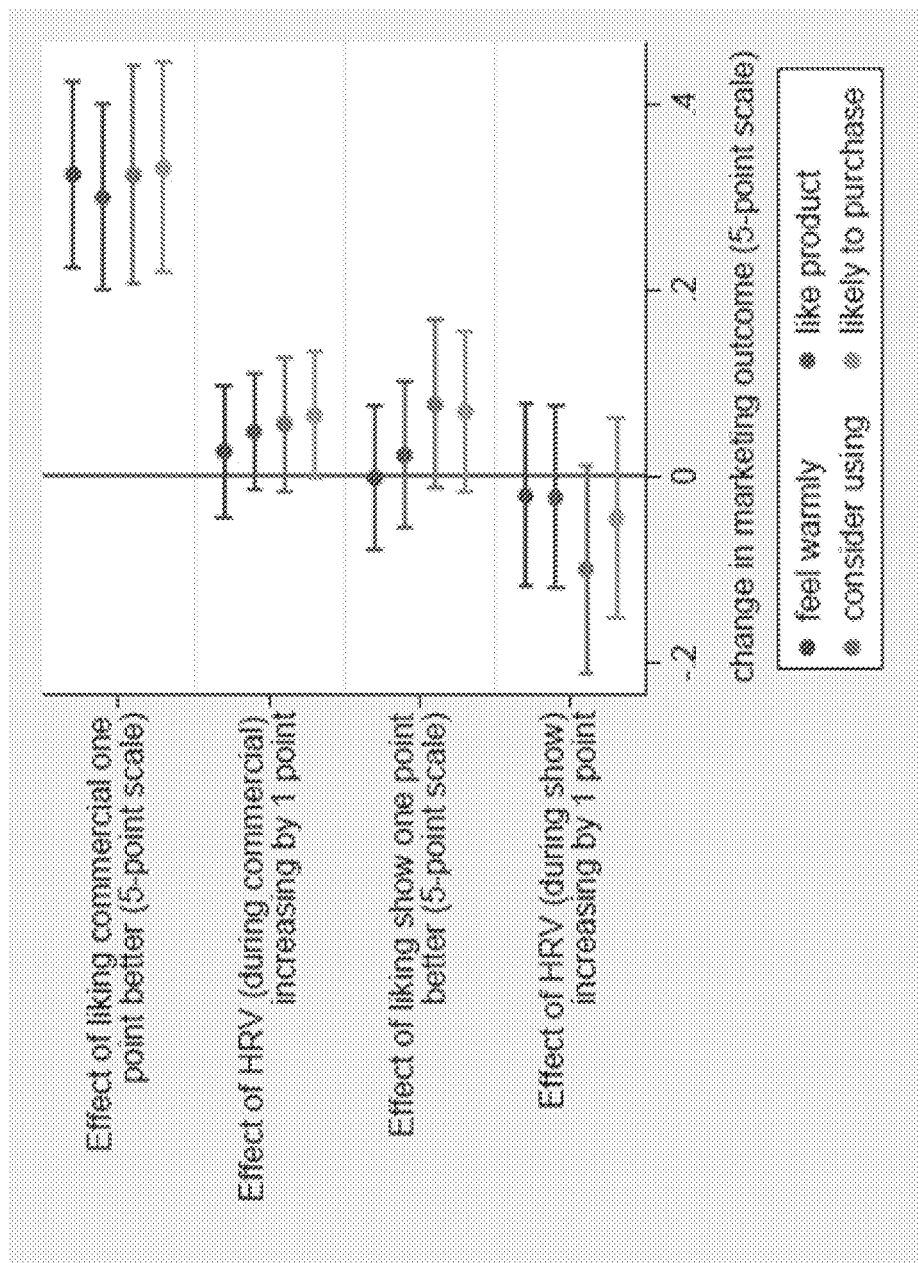
FIG. 6 is a diagram illustrating relating audience engagement and the quality of the preceding show and the commercial to the foregoing marketing outcomes.

FIG. 6 is a diagram illustrating relating audience engagement and the quality of the preceding show and the commercial to the foregoing marketing outcomes. The dependent variables are marketing outcomes of interest and the capped lines represent a 95% confidence interval. The plots in each group from top to bottom represent "feeling warmly," "like product," "consider using," and "likely to purchase." The results show that subjects who better like the ad also felt more positively about the product, and they were more likely to report a willingness to purchase it. A qualitatively similar but much smaller effect was found for "liking" the show. More importantly, audience engagement during the commercial was also related to positive marketing outcomes. By contrast, engagement during the show had no independent influence on the marketing metrics.

Looking at the size of the estimated effects, one might be tempted to think that audience engagement is a fairly small influence, in particular when it is compared to the effect of "liking" the commercial. But this conclusion is unwarranted for two reasons. First, there is far more variation in HRV (standard deviation is 2.6 during the shows and 3.7 during commercials) than in "liking" (standard deviation is 1.3 during the shows and 1.2 during commercials). Reasonably, one would compare the effect of a similar change in a covariate, say, a one standard deviation increase, which implies that the audience engagement measures are two to three times larger than the estimated coefficients seem to imply. Second, in our analyses of the engagement with commercials, we found an important carryover effect between the shows and the advertisements. More engagement during content led to more engagement during the commercial block. As a result, the coefficient on engagement during the show is asking whether there is an independent effect on marketing outcomes over and above the influence of engagement during the show on engagement during the ads. This appears not to be the case.

The laboratory results showed that audience engagement, measured as HRV, varies significantly by show and commercial message, and revealed an important engagement carryover effect the more engaged a person is with the content of a television show, the more engaged the person will be with the commercial-regardless of whether that commercial is emotionally consistent or inconsistent with the valence and arousal of the television show. Finally, we observed that higher levels of engagement during commercials led to desirable marketing outcomes.

The foregoing results may have important implications for the television business. Since engagement appears uncorrelated with the likelihood of watching a show, brands may have an opportunity to place their ads in smaller (and less expensive) shows with highly engaged audiences. This re-allocation has the potential to raise the returns to television advertising. More generally, the documented carryover effect suggests that the effectiveness of commercials critically depends on the programming environment in which the commercial is placed.

Precision of Commercially Available Wristbands

Since it was known that field testing would be required to further investigate the engagement carryover effect and that such field testing would require use of commercially available wristbands to measure HRM, subjects in the laboratory tests also used commercially available wristbands so that the data from such wristbands and data taken from laboratory equipment could be compared to assure they were adequately correlated. Averaging the correlation between HRV from standard medical equipment (ECG) with that from a commercially available ZOOM wristband across all events (both TV shows and commercials) revealed a highly significant correlation of r=0.32. These data showed us that HRV could be measured with a simple wristband in the field. However, some wristbands (the ZOOM wristband in particular), requires pressing a button throughout the experiment so that measurements could be taken. Thus, in the field experiments described below, a different, and superior, wristband model was used that did not require any subject involvement.

Field Study of the Engagement Carryover Effect

The results of the foregoing laboratory experiment were interpreted with caution, because the subjects watched a small number of shows and commercials in an artificial environment. A filed study is required to test whether laboratory results generalize to a broader universe of people, television shows and commercial advertisements.

The participants in our study were members of a representative panel, and each participant received a dedicated device with two applications. A first application provided automatic audio recognition that allowed the determination of what channel a participant was watching. The listening function was always on and could not be turned off. Every 8 seconds, there was a 2 second gap in data capture. Those 2 seconds were used to transmit the data from the device to the cloud.

The second application executing on the device recorded participants' HRV data, which we collected from a wristband developed by WAVELET HEALTH. The wristband includes a comfortable, thin silicone band with an accelerometer, a gyroscope, and a photoplethysmography (PPG) sensor that uses Dual Red and IR LEDs to capture the heart wave depicted in FIG. 1. Measurement results using these sensors and standard ECG equipment were correlated across three emotionally evocative videos with a mean correlation value of r=0.357.

The wristband was connected to the application executing on the device via BLUETOOTH wireless technology. The participants wore the band while watching television, and HRV data was captured continuously for five minutes, followed by a ten-minute period during which the application uploaded the data to the cloud. The collection of data was interrupted when the Bluetooth connection was lost or when participants moved drastically, since movement can cause the wristband band to recalibrate.

Finally, field study participants were asked to answer survey questions assessing the same dimensions as in the lab experiment. Participants completed an opening and a closing survey, and they received a battery of (identical) questions every other night. Nightly surveys to assess the likability of programs and commercials and to test brand recall.

While the design of the field study closely followed the laboratory study, a critical difference is the type of variation that we observed in the field. In the lab, participants could not choose which shoes and advertisements they were shown. Instead, the shows and advertisements were chosen by the designers of the study. In the more realistic field setting, the participants freely chose the times when they wanted to watch television and selected the content. The difference is crucial. In the lab, the level of engagement was observed during shows that people may or may not ever watch in real life. Perhaps it is not surprising, then, that substantial differences were observed in engagement under these circumstances. By contrast, when people watch their favorite content, it seems much more likely that their level of engagement would end up being generally higher and quite similar.

For commercial messages, the situation is more complicated still. From the viewer's perspective, there is no self-selection. Viewers typically don't watch a particular program in order to see a specific commercial. But there is selection from the brand's perspective because companies are thoughtful about the audience that they want to reach. If a customer's expected level of engagement helps guide targeting efforts, little difference would be seen in engagement across ads, not because these differences do not exist but because they are attenuated in a world in which everyone sees highly engaging commercials. To address this issue, a subset of ads were randomly placed. Over 13% of the ads in the study were broadcast in randomly chosen programs, allowing the observation of true differences in engagement during the commercial breaks.

HRV is calculated as the root mean square of successive differences (RMSSD) between heartbeats. RMSSD is defined as follows:

$$RMSSD = \sqrt{\frac{1}{n-1} \sum_{i=1}^{n-1} (RR_{i+1} - RR_i)^2}$$

where RR is the interval illustrated in FIG. 1. We present our results in three steps. First, as in the laboratory experiment, we were interested in identifying high-engagement shows and commercial messages as well as understanding the degree to which engagement varies across the two.

FIG. 7 is a diagram illustrating field study participants' mean HRV across the types of television shows. The horizontal line represents the mean HRV for these show categories. A simple regression of HRV on categories of television shows (N=3,412) revealed that, similar to our findings in the lab, there was considerable variability in HRV. Sports, the best performing category in FIG. 7, was similarly engaging as movies (p=0.298) and television series (p=0.502) but more engaging than the category of factual (non-fiction television) (p=0.000). One surprise in FIG. 7 might be the solid performance of commercials. Contrary to the view that people "tune out" during commercial breaks, this result indicates that only sports was significantly more engaging than commercials. A statistically significant difference in engagement between commercials and local shows 8 (p=0.332), movies (p=0.206) and series (p=0.199) was not found.

The differences illustrated in FIG. 7 could possibly stem from two very different underlying processes. First, the media is largely passive and different shows attract first and foremost differentially engaged persons. For example, the high levels of engagement that we observed during sports might simply reflect that highly engaged individuals happen to love sports. In this view, television sorts the audience by type of person. A second possibility is that television actively produces engagement. Rather than simply sorting the audience—that is attracting individuals with high HRV to watch sports—viewers of all types might become more engaged when they see an exciting and well-produced sports show. We can distinguish the two mechanisms by controlling for individual fixed effects in our regression. These analyses hold constant all time-invariant personality traits, including a person's average HRV.

Figure 8:
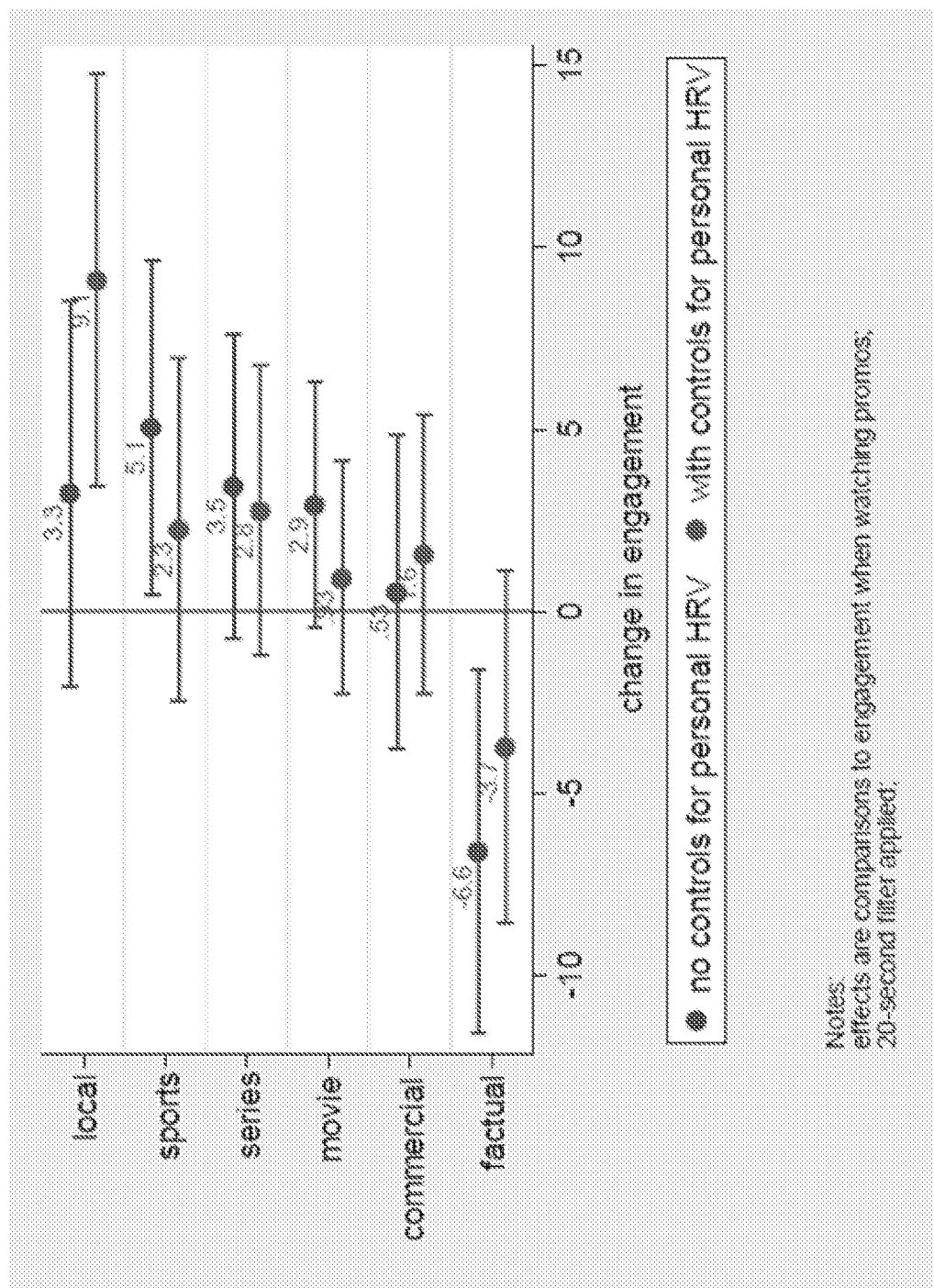
FIG. 8 is a diagram illustrating analogous results in which individual fixed effects were controlled in the regression.

FIG. 8 is a diagram illustrating analogous results in which individual fixed effects were controlled in the regression. The dependent variable is the HRV during the show and capped lines represent the 95% confidence intervals. The results are mixed. First, consider sports shows. Compared to watching promos, participants' HRV was 5.1 points higher when they watched sports. When controlled for personal characteristics (including a person's resting HRV) the difference between watching sports and watching promos declined to 2.3 points. In other words, personal attributes contributed in a positive manner to the engagement of those watching sports. Highly engaged individuals, our data suggest, flocked to sports. The opposite was true for local shows, factual (and commercials). For these types of shows, the difference between watching promos and watching the shows increased, suggesting that the media created additional engagement with the content that was aired.

As a whole, analysis indicates that television programming has two effects: It sorts the audience by HRV, sending more engaged types to shows like sports and movies. But it also creates additional excitement, an effect that is particularly important for local and factual (non-fiction) shows.

Engagement During Commercials

We have already seen that the average level of engagement during commercial breaks is not too dissimilar from levels of engagement during many types of shows. In this section, we studied which product and service categories provided the most engaging advertisements.

Figure 9:
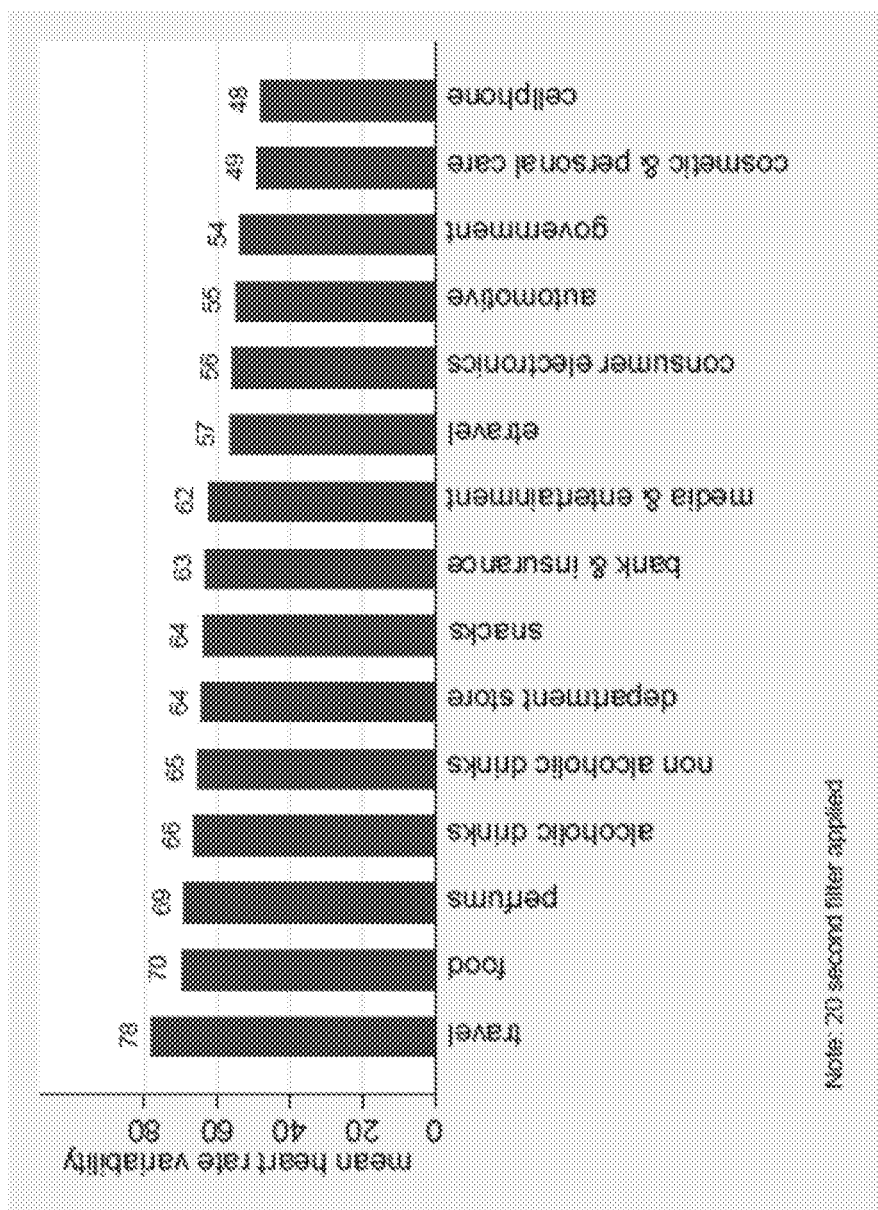
FIG. 9 is a diagram illustrating the HRM for different advertisement types/categories.

FIG. 9 is a diagram illustrating the HRM for different advertisement types/categories. Perhaps surprisingly, the difference in engagement across categories of commercials was far larger than this difference across different types of shows. Our participants were particularly engaged during travel commercials. Levels of HRV were lowest during advertisements for cellphones. There are many reasons for the variation in FIG. 9, including differences in creativity, frequency of exposure, and ad placement.

One key difference between the laboratory study and the field study was that the participants freely selected their shows in the latter. As we suggested earlier, this self-selection may attenuate the differences in engagement across shows and commercials. This effect notwithstanding, we still found significant differences in engagement were manifested in the field studies. Some of these reflect individual differences—highly engaged individuals being attracted to specific types of shows—others are the result of television writers and producers creating engagement.

Engagement Reach and Ratings

Traditionally, the attractiveness of television shows was measured by reach (the size of the audience) and by television ratings. These two factors help determine the price of commercials. It is an interesting question whether or not HRV is similar to reach and ratings. If this were not the case, current ad prices might poorly reflect the true value of advertising. Conversely, if HRV was just a proxy for reach and ratings, studying engagement would add little to our understanding of the effectiveness of television advertising.

Figure 10:
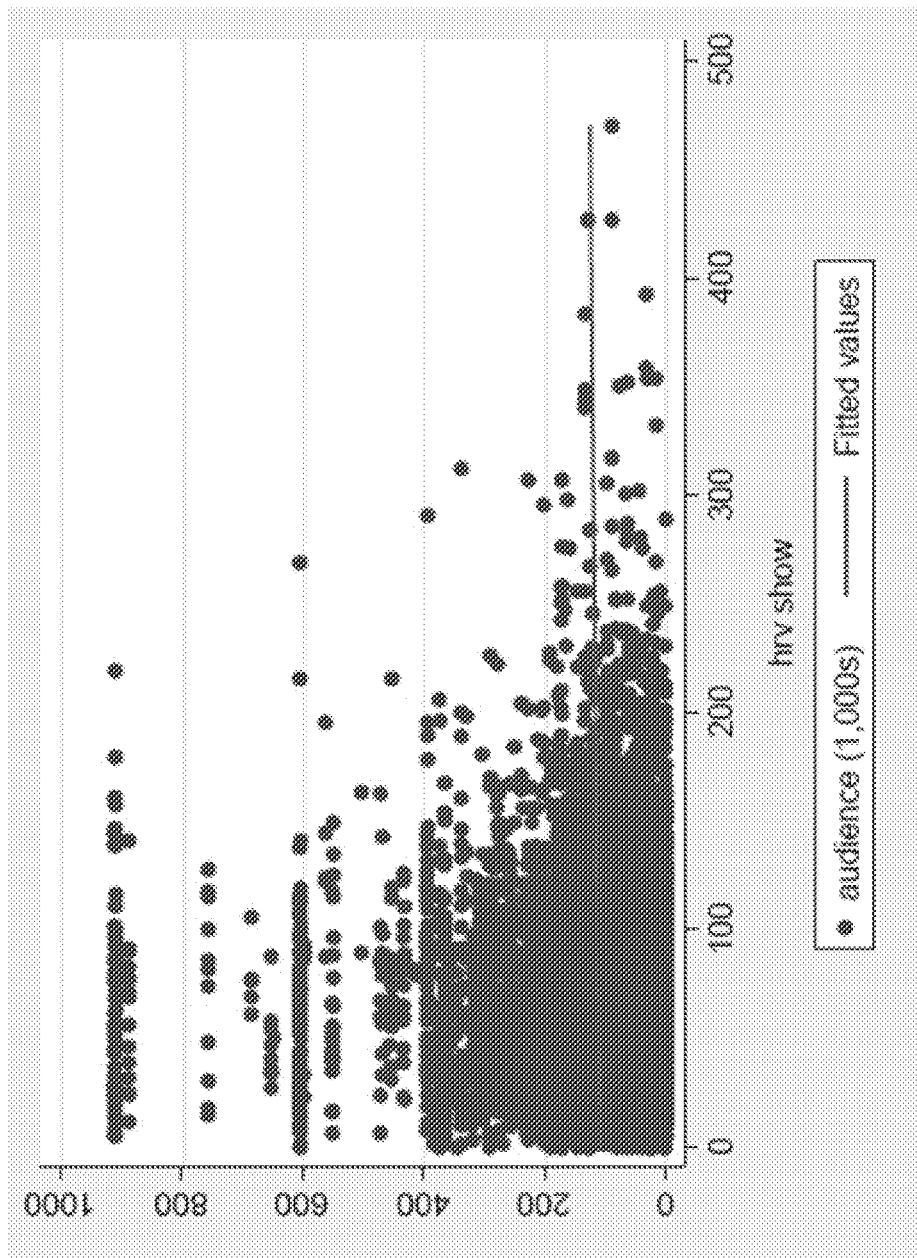
FIG. 10 is a diagram illustrating the correlation between HRV and reach.
Figure 11:
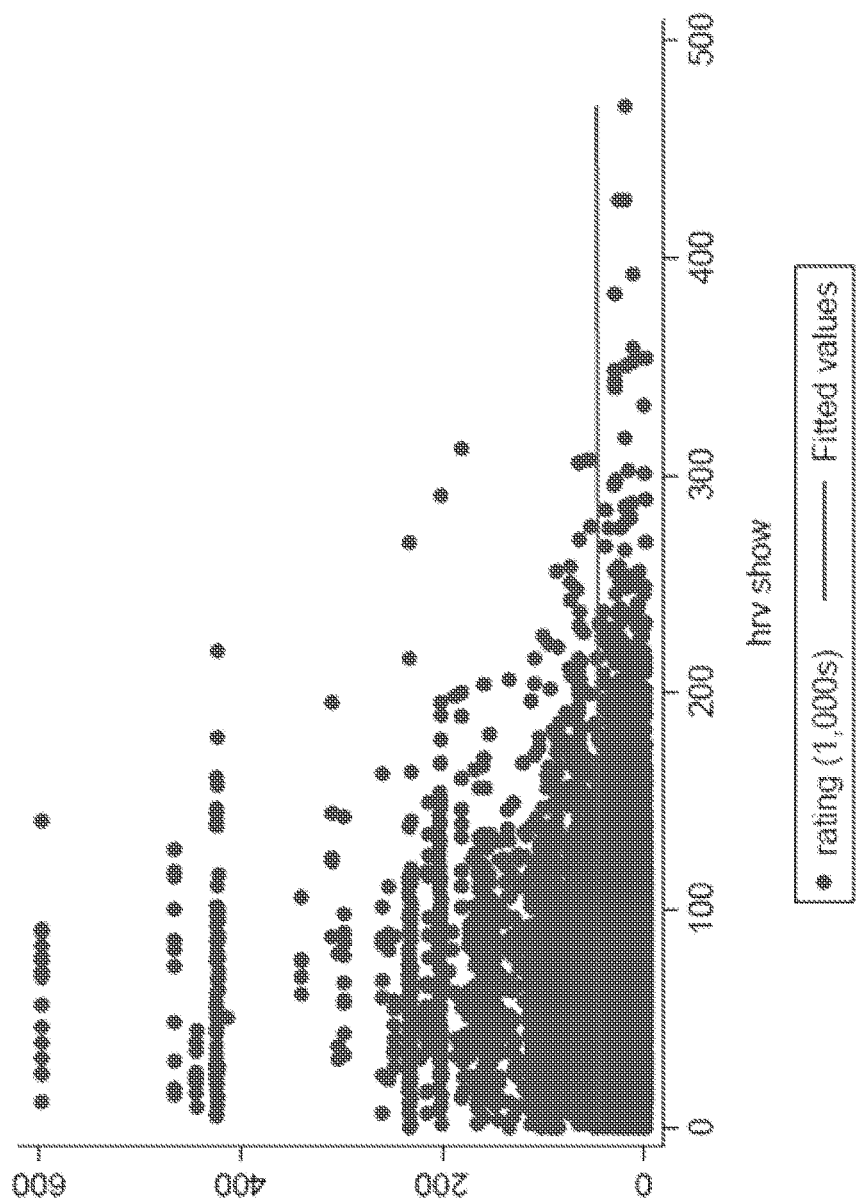
FIG. 11 is a diagram illustrating the correlation between HRV and ratings.

FIG. 10 is a diagram illustrating the correlation between HRV and reach. The line in the graph is the prediction of reach from a linear regression of reach on HRV. FIG. 11 is a diagram illustrating the correlation between HRV and ratings. The line in the graph is the prediction of ratings from a linear regression of ratings on HRV. As the graphs indicate, this correlation was very low in our data ($r=0.0019$ for reach and $r=-0.0044$ for ratings).

Audience engagement, as measured by HRV, is a third dimension that is not captured by reach or ratings. One implication of the data in FIGS. 10 and 11 is that marketers may be able to substitute shows with mass appeal for shows with smaller but more engaged audiences while preserving the effectiveness of their advertising.

Engagement Carryover Effect

Figure 12:
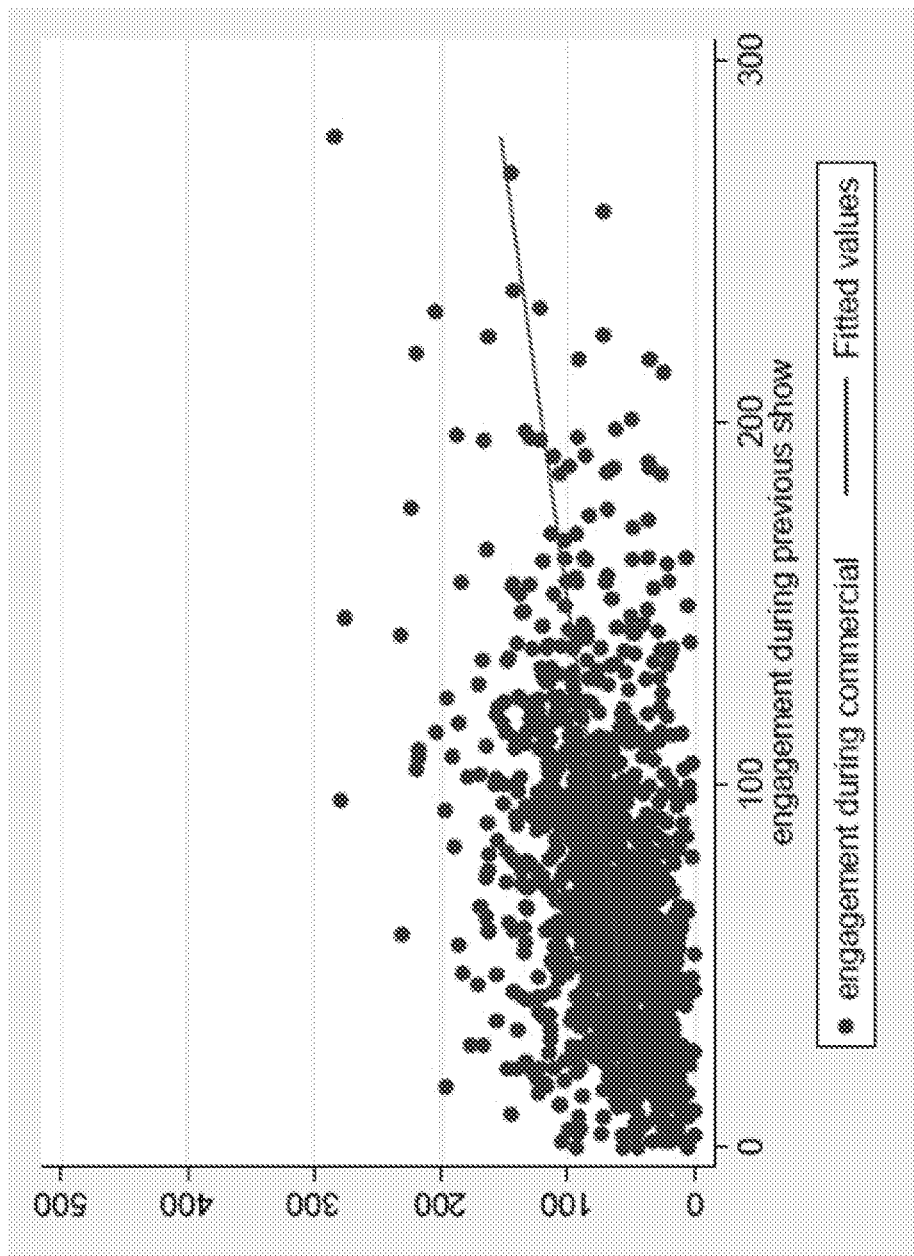
FIG. 12 is a diagram illustrating the engagement carry over effect as evidenced by a correlation between HRV during a preceding show and HRV during the subsequent commercial block.

The field study was also performed to investigate the engagement carry over effect suggested in the laboratory study. FIG. 12 is a diagram illustrating the engagement carry over effect as evidenced by a correlation between HRV during a preceding show and HRV during the subsequent commercial block. The line in the graph is the prediction of HRV during the commercials from a linear regression of HRV during the preceding show and HRV during the subsequent commercial block.

As shown in FIG. 12, there appears to be a correlation between HRV during the previous show and HRV during the commercial block, specifically, there appears to be a positive link: greater engagement during the preceding show led to greater engagement during the commercials.

The correlation depicted in FIG. 12 might be driven by many factors. For example, the type of show that preceded the commercial block or personal characteristics might underlie the observed association. To control for these factors, a fixed effects model was estimated that included indicator variables for the type of show that preceded the commercial block.

Figure 13:
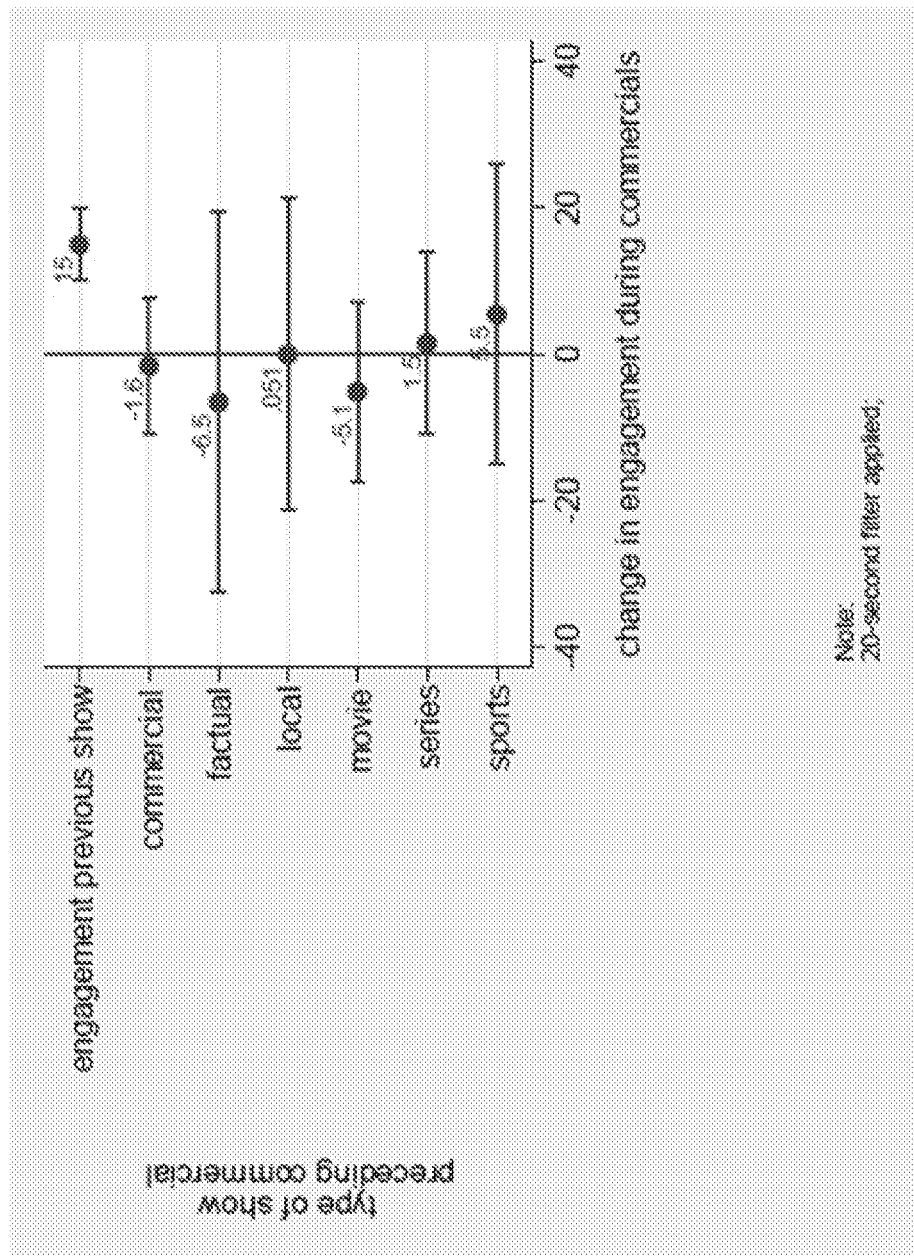
FIG. 13 is a diagram depicting the engagement carryover effect.

FIG. 13 is a diagram depicting the engagement carryover effect. The dependent variable is HRV during the commercial. We show the effect of a one-standard-deviation increase in HRV during the previous show. The model controls for personal characteristics. The capped lines in the graph are the 95% confidence intervals.

Even with these controls for personal characteristics, the carryover effect was still evident levels of engagement were linked across programming and commercial breaks. For every one-standard-deviation increase in HRV during a show, HRV during the commercial break increased by 15 points. These findings are consistent with the "mood congruency" hypothesis, the idea that happier television programs would put viewers in a happier mood during commercial breaks as well. The carryover effect observed in both of our studies has important implications for the placement of TV ads.

These results substantially resolve the five issues posited above. The first issue was if a common physiological marker of audience engagement, HRV, would vary in significant and intuitively plausible ways across programs and blocks of advertising. Our results showed that this was in fact the case. Even in the field study when the participants chose their own shows, we found substantial differences in physiological engagement.

The second issue was the source of the observed variation in engagement. The above results support both for audience selection effects—levels of engagement during sports, for instance, seem to reflect the fact that individuals with higher levels of HRV flock to sports—and the view that well-produced shows can create additional engagement. The latter effect was particularly important for local shows aired on broadcast TV. These results have important implications for the resource allocation decisions of television producers. Some shows benefit from tailwinds—they naturally attract highly engaged individuals—while there is more scope for a skilled producer to increase audience engagement in other genres.

The third issue was whether engagement was just a proxy for reach and ratings or a substantially independent factor. The laboratory results show that, HRV is correlated with the likelihood of being a loyal fan of a show. But, more generally, no correlation was found between HRV and reach or ratings. Since the latter largely determines advertising prices, there are potentially interesting arbitrage opportunities for brands that advertise on television. Rather than buying advertisement time during the show with high reach (expensive), brands might opt for smaller but more engaged audiences, achieving a similar marketing outcome at a potentially lower cost.

The fourth issue was whether there was an engagement carryover effect. Both the laboratory and field test confirm the existence of the engagement carryover effect. More engaging shows increase the value of commercials embedded within them.

The final issue was whether more engaging commercials would lead to more favorable marketing outcomes. We defined these as liking a brand, feeling warmly toward it, consideration of using a product and the stated likelihood of purchase. Our laboratory results indicated that higher levels of HRV during the commercial make these outcomes more likely. HRV during the preceding programming, by contrast, was not correlated with brand perceptions and the likelihood of purchase. Engagement during the show influences marketing outcomes in an indirect way, through the observed carryover effect more engagement during a TV show causes engagement during the commercial block which, in turn, leads to better marketing outcomes related specifically to the commercials observed.

These findings suggest that it is valuable to gather HRV data continuously and for every episode of a program, most effectively alongside the historically used metrics. HRV is an especially intriguing measure because it does not rely on the self-report of viewers who may not know what they like or may be reporting what they think they are supposed to like.

The foregoing supports a novel approach to observing the level of engagement of television audiences. Using a simple wristband and a smartphone with two applications, we tracked, second by second, variation in audience engagement in the laboratory and in a field study. We believe this to be the first large field study using this physiological measure of engagement. The results are useful to help assess the attractiveness of television programming and commercials. These data are also useful for the placement and the pricing of ads.

Application of Carryover Effect to Media Program Distribution System

Figure 14:
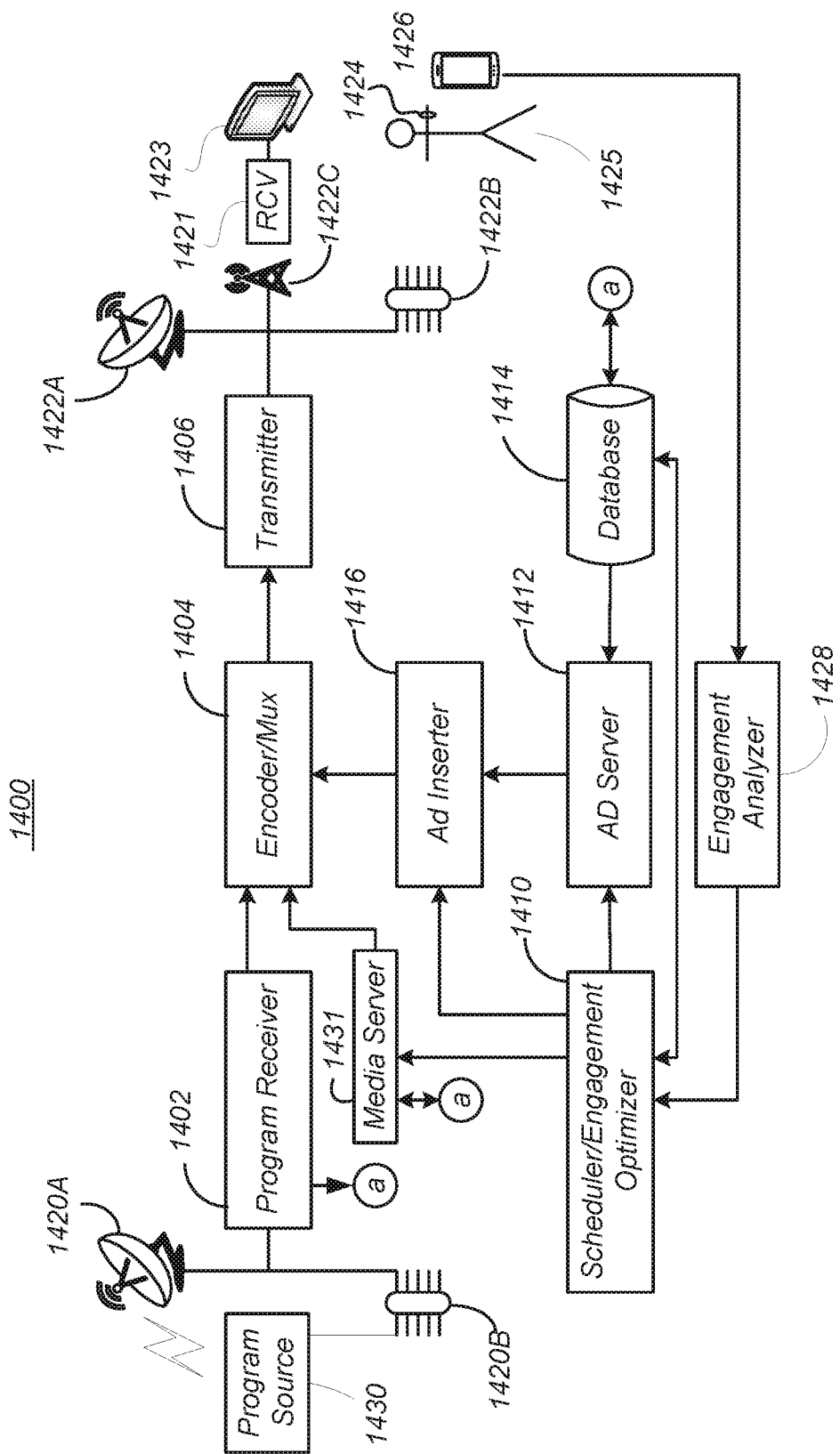
FIG. 14 is a diagram of a system for distributing media programs.

FIG. 14 is a diagram of a system for distributing media programs, or MDS (media program distribution system) 1400. The MDS 1400 comprises a media program receiver 1402, which receives media programs from one or more media program sources 1430. The media programs may be obtained via a communication link 1420 such as a wireless (e.g. satellite) link 1420A or by wired link 1420B (e.g. cable network) or other communication medium. In one embodiment, the program source 1430 comprises comprise a content developer such as a movie studio (FOX, PARAMOUNT, or DISNEY) or other production entity (e.g. ESPN) external to the MDS 1400. In another embodiment, the program source 1430 is an aggregator of content provided by a plurality of content providers. In still another embodiment, the program source 1430 is within the MDS 1400 itself (e.g., the MDS may produce its own media programs). Similarly, the MDS 1400 receives advertisements from advertisement production entities (also potentially via satellite link 1420A or cable link 1420B. Such advertisements are stored in database 1414 where they can be retrieved for further use.

The MDS 1400 also comprises a program receiver 1402 for receiving the program content (e.g. media programs) transmitted by the program source 1430. In one embodiment, the data received by the program receiver includes metadata describing the media programs. This metadata includes information used by the MDS 1400 to identify and characterize each media program so that the scheduling of advertisements and other media programs may be optimally performed. In other embodiments, this metadata is obtained from sources other than the program source and stored in database 1414. For example, such metadata can be generated by the MDS 1400 itself or the entity controlling the MDS 1400 and simply stored in the database.

Such metadata may include, for example, the title, media program segments, between which advertisements may be included, length, engagement score of the media program and engagement score of each segment of the media program, viewer demographic information, ratings, reach, and demographic information.

Media programs and content received by the program receiver 1402 can be stored in the database 1414 and later retrieved for transmission, or immediately provided for transmission via communicatively coupled encoder/multiplexer 1404 and transmitter 1406. The encoder/multiplexer 1404 encodes the media program into a format suitable for transmission. Such encoding can include, for example, compression via MPEG or similar construct, and packetizing or chunking, for example according to HIS or similar construct. Multiplexing can include, for example, time division multiple access multiplexing (TDMA), frequency division multiple access (FDMA), code division multiple access (CDMA) or any combination thereof. The encoded and multiplexed media programs and advertisements are then transmitted by transmitter 1406 via transmitting link 1422, which may comprise any one or all of a satellite transmitting link 1422A, a cable transmitting link 1422B, or wireless terrestrial transmitting link 1422C. The transmitted media programs and advertisements are received by a receiver 1421 and provided to a communicatively coupled display device 1423 for viewing by the viewer 1425.

Media programs may also be received by the program receiver 1402 and provided to the communicatively coupled database 1414 for later transmission. In this case, the media programs are provided from the database 1414 to the media server 1431, and thence to the encoder/mux 1404 and transmitter 1406. Advertisements also may be received via the program receiver 1402 and stored in databased 1414. Advertisements are provided from the database 1414 to the advertisement server 1412, and to an ad inserter 1416, which provides the advertisements to the encoder/mux 1404 for insertion into the transmitted data stream. Engagement optimizer/Scheduler 1410 schedules which media programs and advertisements are to be provided to the encoder/mux 1404 for transmission, and when such media programs and advertisements are to be transmitted.

In one embodiment, at least some of the viewers 1425 of the media programs wear a biomedical measurement device 1424 capable of measuring a biometric that correlates with the engagement of the viewer 1425 watching the media programs and advertisements on the display 1423, for example, heart rate variability (HRV), as described above. The biomedical measurement device 1424 is communicatively coupled to a communication device 1426 such as a smartphone. In one embodiment, the communication device 1426 is a smartphone, that communicates via Wi-Fi, Bluetooth or cell service. The communications device 1426 communicates engagement information to the engagement analyzer 1428 for processing. In one embodiment, the engagement data is batched to the engagement analyzer 1428 in non-real time for later use in scheduling advertisements to be presented in connection with particular media programs. In other embodiments, the engagement data received by the engagement analyzer is received in near time or near real time but is stored in the database for later use in selecting and scheduling media programs and advertisements to present to the viewer 1425. In still further embodiments, the engagement data is received in real time and used in real time to select advertisements and/or media programs for viewing by the viewer 1425.

Figure 15:
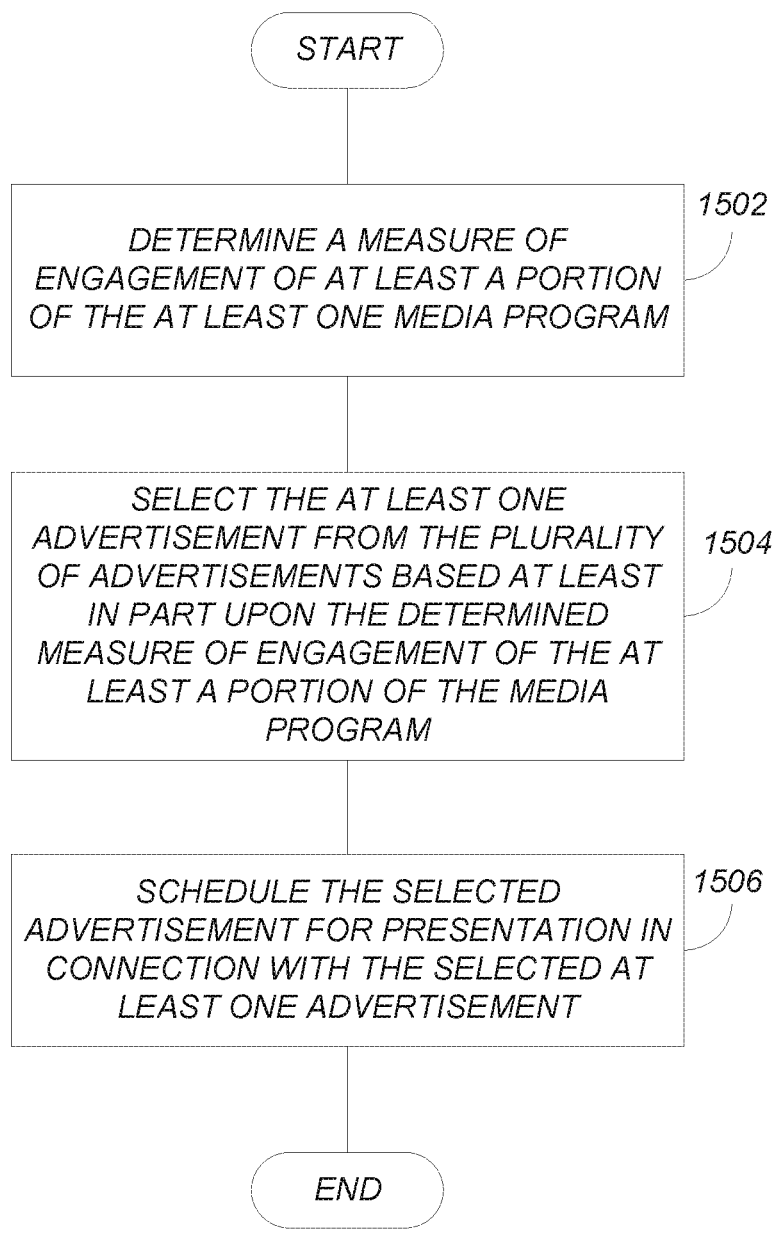
FIG. 15 is a diagram illustrating exemplary operations performed to schedule at least one advertisement for presentation in connection with at least one media program.

FIG. 15 is a diagram illustrating exemplary operations performed to schedule at least one advertisement for presentation in connection with at least one media program. In block 1502, a measure of the engagement of at least a portion of the media program is determined. In block 1504, at least one advertisement is selected from a plurality of available advertisements at least in part according to the determined measure of engagement of the at least a portion of the media program. Finally, in block 1506, the selected advertisement is selected for presentation with the selected at least one advertisement. The foregoing operations can be practiced in several embodiments, which are discussed below.

Scheduling by Engagement Carry Over of Media Program Type and/or Advertisement Type In one embodiment, the measure of engagement for a particular media program is determined for the entire media program (for example, and entire episode of the Simpsons), and these results are aggregated for media programs by media type. For example, it was noted in the studies described above that particular types of media programs (e.g. live sports programs), are more engaging than average across all media types. Although this determination was made by tracking the HRV of viewers to a high degree of temporal precision (e.g. in near real time), this information can be aggregated according to defined media types, and the average or mean engagement of that media type be determined and later used to schedule advertisements. For example, the foregoing studies also noted that there are media programs that, while they have less reach than the most popular of media programs, are highly engaging. One such example is presented in FIG. 8, which illustrates that local programming, even when controlled for personal HRV, has a greater level of engagement than a movie or a factual media program. Using a simple model, the engagement optimizer 1410 may perform the operations of block 1502 by noting that the scheduled media program has been placed in the "local" category of media programs, and hence, have an aggregate engagement value of 9.1. The operations of block 1502 may be then selecting a subset of advertisements from a pool of advertisements for presentation along with the local media program. Which advertisements are selected may be determined by a number of different factors. First, because of the engagement carryover effect, the advertisement opportunities in the engaging media program may be determined to be more valuable, and advertisements from customers willing to pay for the more valuable advertisement opportunities may be chosen. Second, since there is not only an engagement carryover effect from the media program to the advertisement, but also from the advertisement to the media program, the engagement analyzer 1428 may use HRM data from viewers 1425 to identify particularly engaging advertisements, and schedule those advertisements in the advertisement opportunities of the media program, thus using the engagement carryover effect to benefit the content following the advertisement (which could include either another advertisement or the media program). The benefit of the engagement carryover effect thus benefits the programming which follows the advertisement, an effect that can be taken into account in determining the cost for presenting the advertisement in the advertisement opportunity. For example, if a media program in the highly engaging "local" category, the advertisement opportunities appurtenant to that media program are, other factors such as reach and demographics being equal, more valuable than those of a less engaging informational program. But at the same time, if an advertisement is particularly engaging (for example, a travel advertisement, which, as an advertisement type, has a mean HRV of 78), the engagement carryover effect from that advertisement benefits the advertisement that follows the travel advertisement, or the media program following the travel advertisement. Accordingly, the fee charged for the travel advertisement may be reduced and the fee charged for the following advertisement increased to account for the engagement carryover effect.

Accordingly, in this first embodiment, the engagement of advertisements and/or media programs are determined according to media program or advertisement type, and the engagement optimizer 1410 schedules the advertisements to be presented with the media program according to the media program or advertisement type, for example, using the average engagement or the media programs or advertisements.

Scheduling by Measured Engagement Carry Over of Media Program and/or Advertisement Scheduling according to media program and/or advertisement type can be advantageously accomplished with simplified algorithms and without requiring measured engagement data for each media program and/or advertisement presented. However, better optimization results can typically be obtained in cases where engagement data is available on a media program-by media program and/or advertisement-by-advertisement basis, and the scheduling is performed accordingly. In this embodiment, the operations performed in block 1502 include determining a measure of engagement of each media program, and the selection operations performed in block 1504 include selecting, from the plurality of advertisements, a subset of advertisements for presentation in connection with each of the plurality of media programs, with each selection based at least in part on the determined engagement of each program in the plurality of media programs.

In this embodiment, the engagement analyzer 1428 has collected engagement information regarding the engagement (and optionally, reach and demographics) each media program (e.g. an episode of the Simpsons or other serial, a movie, or news program), and the engagement optimizer 1410 uses this information to schedule advertisements to be presented with the media programs. Optionally, the database 1414 may also store engagement (as well as reach and demographic) information regarding the advertisements, and this information is also used to schedule advertisements to be presented with the media programs. As described above, the engagement data regarding advertisements is useful for using the engagement carryover effect to benefit advertisements or media programs that follow the advertisement.

Even better optimization results may be obtained in cases where engagement data is available on a media program-by media program segment and/or advertisement-by-advertisement basis, and the scheduling is performed accordingly. In this embodiment, the operations performed in block 1502 include determining a measure of engagement of each media program segment (and not by media program type), and the selection operations performed in block 1504 include selecting, from the plurality of advertisements, a subset of advertisements for presentation in connection with each of the plurality of media programs, with each selection based at least in part on the determined engagement of each media program segment in the plurality of media program segments for each media program.

In this embodiment, the engagement analyzer 1428 has collected engagement information regarding the engagement (and typically, reach and demographics) each media program segment (e.g. the first segment of an episode of the Simpsons or other serial before the first advertisement break), a movie, or news program), and the engagement optimizer 1410 uses this information to schedule advertisements to be presented with the media programs. Again, as described above, the engagement data regarding advertisements is useful for using the engagement carryover effect to benefit advertisements or media programs that follow the advertisement.

Figure 16:
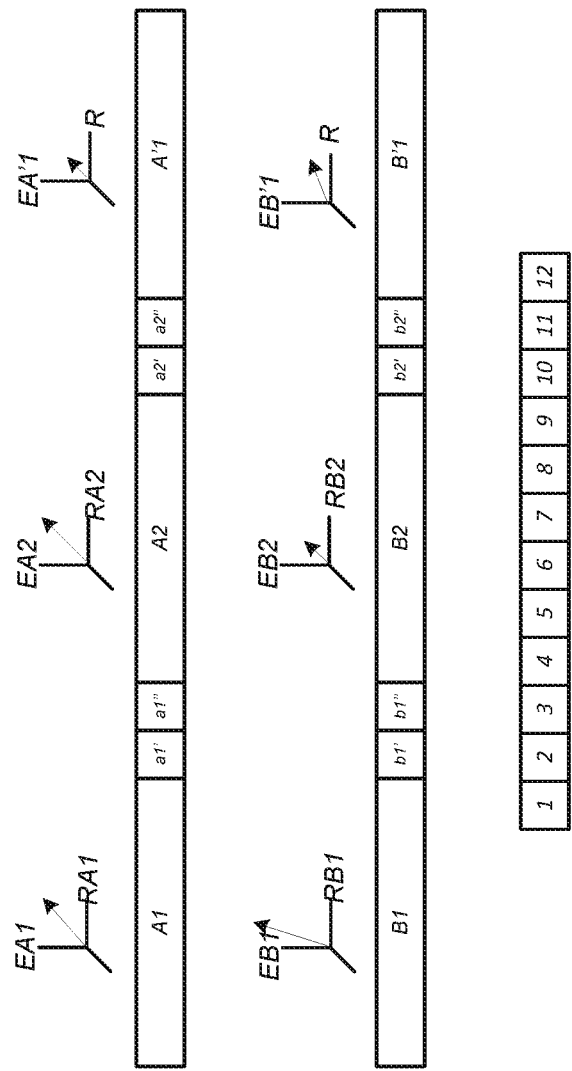
FIG. 16 is a diagram illustrating one allocation of advertisements to media programs or media program segments.

FIG. 16 is a diagram illustrating one allocation of advertisements to media programs or media program segments. In the illustrated example, a first media program A comprises a plurality of media program segments A1 and A2, each of any temporal length, with an advertisement block comprising one or more advertisement opportunities a1', a1" of any temporal length therebetween. A first segment A'1 of a media program A' (temporally presented after media program A in the same program stream or channel) is also illustrated with advertisement opportunities a2' and a2" presented therebetween. A second media program B may comprise a plurality of media program segments B1 and B2, also each of any temporal length with one or more advertisement opportunities b1', b1" of any temporal length therebetween. A first segment B'1 of a media program B' (temporally presented after media program B in the same program stream or channel) is also illustrated with advertisement opportunities b2' and b2" presented therebetween. Further note that there are 12 advertisements (1-12), any or all of which can be inserted into the advertisement operations a1', a1", a2', and a2" and b1', b1", b2', and b2".

Each media program segment has an associated engagement value. For example, the engagement value for media program segment A1 is EA1, and the engagement value for media program segment A2 is EA2. Ordinarily, the desirability or effectiveness of an advertisement opportunity following a media program segment would be estimated by the reach and demographic of the media program as well as other values. However, in this embodiment, the desirability or effectiveness of the advertisement is also a function of the engagement value of the preceding media program segment, with the engagement value being a substantially independent factor. For illustration purposes, FIG. 16 illustrates the aggregate effect on the effectiveness or desirability of the advertisement illustrated by the length of a multidimensional vector with the engagement value on the y-axis and the reach on the x-axis. Other dimensions may include demographics or other factors. For purposes of illustration, we consider only reach and engagement in the example below.

Since one would expect the reach of a media program to be substantially time invariant during the media program, media program segments A1 and A2 are illustrated to have the same reach (RA1=RA2), as media program segments B1 and B2. This is illustrated by the vector length in the x-axis being the same in both cases. Similarly, media program segments B1 and B2 have the same reach (RB1=RB2). However, the reach of media program B (and hence, media program segments B1 and B2 is half that of the reach of media program A (and media program segments A1 and A2).

Media program segment A1 has an engagement value EA1, and media program segment B1 has an engagement value EB1 which is 30% higher than EA1. The result is that because of the engagement carryover effect, the desirability of placing advertisements in the advertisement opportunity b1' following media program segment B1 is greater that that of placing advertisement in the advertisement opportunity a1' following media program segment A1, even though the reach less.

FIG. 16 also illustrates the notion that the engagement of one segment of a media program may be greater or less than another segment of the media program. The reach RB1 of media program segment B1 is equal to the reach RB2 of media program segment B2, however the engagement value EB1 for the first segment of the media program B1 is much greater than the engagement value EB2 of the second segment of the media program B2. This may be the case, for example, if the first media program segment B1 has particularly engaging content (for example and involving or evocative chase scene), while media program segment B2 has program content that is much less engaging.

FIG. 16 also illustrates a case where an advertisement may be scheduled to precede a media program in order to use the engagement carryover effect to enhance the engagement of the media program following the advertisement. For example, media program A', which follows media program A is illustrated as having a smaller reach than media program A. If the engagement of advertisement 1 is significantly higher than the engagement value of the other 12 advertisements, the placement of advertisement 1 in advertisement opportunity a2" creates an engagement carryover effect that can help increase engagement of media program A', beginning with segment A'1.

The engagement optimizer 1410 schedules advertisements 1-12 within the advertisement opportunities a', a1", a2', and a2" and b', b", b2', and b2". This can be accomplished according to a variety of optimizing criteria, as further discussed below.

Engagement Optimization Criteria

In one embodiment, the engagement optimizer 1410 is used as a tool to help advertisers determine how to best allocate advertisements or advertisement expenses to achieve a desired response in terms of brand recognition, purchase decisions, or other measures. Previously, such decisions would be made based primarily on reach and/or demographics, and advertisement opportunities within media programs having high reach values may be chosen, even though such advertisement opportunities often come at high expense. However, as shown above, our studies have shown that the engagement value of the preceding media program should also be considered, because the engagement carryover effect increases the engagement of the advertisement, and thereby, desired outcomes. Hence, a media program or media program segment with less reach and a high engagement value (such as media program segment B1) may have an equal desired effect as a media program or media program segment with greater reach but a lower engagement value (such as media program segment A1).

In another embodiment, the engagement optimizer 1410 is used as a tool to help the MDS to determine how to best allocate advertisements to maximize advertisement revenue. Again, such decisions were previously made based on reach and/or demographics. However, since the engagement carryover effect increases the value of advertisement opportunities (for example, in terms of estimated revenue derived from the advertisements) following engaging media programs (even those with less reach), the engagement optimizer reallocates some advertisements to advertising opportunities following media programs having smaller reach, but greater engagement value. The engagement optimizer 1410 may also be used to schedule advertisements having high engagement values in advertisement opportunities so as use the engagement carryover effect to increase engagement with the media program following the advertisement. In this paradigm, the engaging advertisement may be presented for a reduced fee because the advertisement's engagement carryover effect can increase viewership and/or engagement of the media program that follows it. In other words, an engaging advertisement may be scheduled to precede a media program that would benefit from the engagement carry over effect from the preceding advertisement. Essentially, the engagement optimizer 1410 can be used by the MDS to orchestrate a combination of advertisements within media programs to take advantage of the engagement carryover effect, both from media programs to advertisements, and advertisements to media programs. Reach and demographics can also be used in concert with the engagement carryover effect. Engagement carryover may be estimated according to demographic (e.g. the engagement carryover of a media program may have different values for different demographics) and the engagement carryover effect used along with demographic information to identify optimal allocations of advertisements to advertisement opportunities. For example, the engagement carryover of a media program effect may be particularly strong in single women under 25, thus rendering an advertisement directed to the same demographic particularly valuable.

Real Time Operation

As described above, the engagement value of media programs and advertisements were estimated by HRV values measured laboratory or field environments. When engagement value is estimated by media program type, it may be assumed that the engagement value of the media program type is relatively constant over time, and the estimated engagement value of the media program type simply used when required. Also, when the media program is a serial having a plurality of episodes, it might reasonably be assumed that the engagement value of each of the episodes is approximately equal to the engagement value of the other episode, and an average value used as the engagement value for all episodes of the serial. Similarly, when the media program is a movie or other media program that has been shown to the public, HRV data can be collected from a subset of that public and used to estimate the engagement value for that movie or media program, or segments of the movie or media program.

For first showings of media programs, the engagement value of the program or individual segments can be determined by privately previewing the media program to a selected group of viewers (e.g. showing the media program before the scheduled public viewing) and using the HRV data collected to estimate engagement value that is later used to optimally allocate advertisements to advertisement opportunities. Advantageously, such a private showing is made more convenient by the use of the biomedical devices 1424 in the homes of viewers selected for this purpose. As described above, the biomedical devices 1424 collect biomedical information such as the heart wave, and transmit this information is transmitted to a communication/processing device 1426 such as a smartphone, for example, by Bluetooth or Wi-Fi. The communication device 1426 accepts this information, processes the information, and transmits the information to the engagement analyzer 1428. This can be accomplished via Wi-Fi or by a standard cellular network. The measured heart wave information may be processed by the communication device 1426 to generate HRM data, or the measured heart wave information may be transmitted directly to the engagement analyzer 1428 for processing. As described above, the communication device 1426 also executes an application that permits it to determine which media program the viewer 1425 is watching, and what part or segment of that media program is being viewed, thus permitting HRM data to be correlated with the media program or media program segment being watched by the viewer 1425.

In another embodiment, the foregoing process is implemented in real time. Instead of previewing the media program before a limited set of viewers, the HRM of the media program is measured by a subset of the viewers 1425 actually viewing the media program, transmitted to the engagement analyzer, and used to optimize advertisement placement in real time. This embodiment is particularly useful for the broadcast or dissemination of live events, as the engagement value of such events may be difficult to determine in advance. For example, a sporting event may be hotly contested, or the outcome may have been determined very early in the event. The real time measurement of engagement of the sporting event to a subset of the viewers allows the engagement analyzer 1428 and engagement optimizer 1410 to use such data to schedule advertisements within the advertisement opportunities of the sporting event. Such real time scheduling can be provided as an option, permitting the advertiser to request that their advertisements be scheduled after such high engagement media program segments for an increased fee.

Hardware Environment

Figure 17:
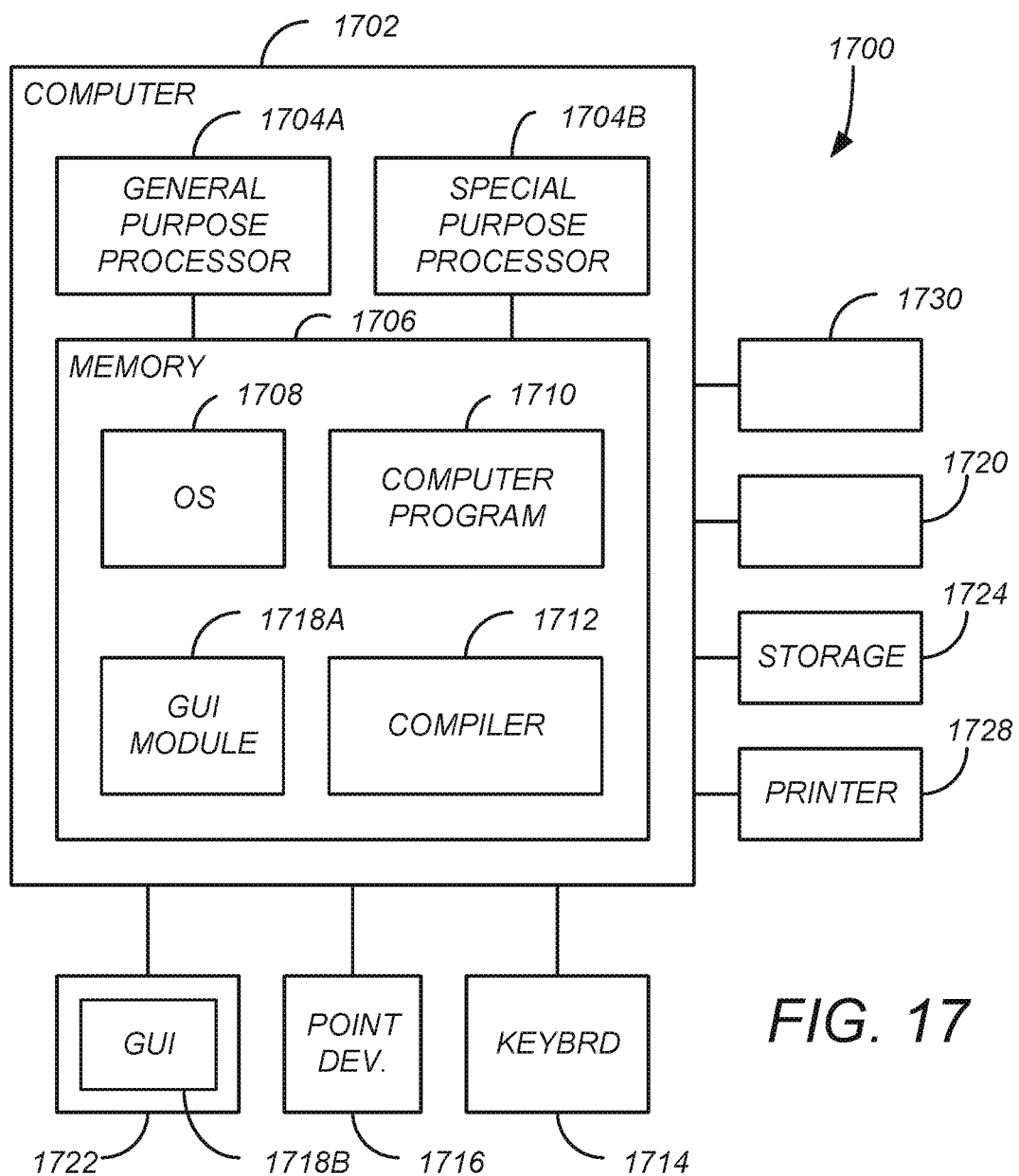
FIG. 17 illustrates an exemplary processing that could be used to implement processing elements of the above disclosure.

FIG. 17 illustrates an exemplary computer system 1700 that could be used to implement processing elements of the above disclosure, including the program receiver 1402, encoder/mux 1404, transmitter 1406, receiver 1421, biomedical measurement device 1424, smartphone 1426, engagement analyzer 1428, database 1414, engagement optimizer 1410, ad inserter 1416, media server 1431, or any combination thereof. The computer 1702 comprises a processor 1704 and a memory, such as random-access memory (RAM) 1706. The computer 1702 is operatively coupled to a display 1722, which presents images such as windows to the user on a graphical user interface 1718B. The computer 1702 may be coupled to other devices, such as a keyboard 1714, a mouse device 1716, a printer, etc. Of course, those skilled in the art will recognize that any combination of the above components, or any number of different components, peripherals, and other devices, may be used with the computer 1702.

Generally, the computer 1702 operates under control of an operating system 1708 stored in the memory 1706, and interfaces with the user to accept inputs and commands and to present results through a graphical user interface (GUI) module 1718A. Although the GUI module 1718B is depicted as a separate module, the instructions performing the GUI functions can be resident or distributed in the operating system 1708, the computer program 1710, or implemented with special purpose memory and processors. The computer 1702 also implements a compiler 1712 which allows an application program 1710 written in a programming language such as COBOL, C++, FORTRAN, or other language to be translated into processor 1704 readable code. After completion, the application 1710 accesses and manipulates data stored in the memory 1706 of the computer 1702 using the relationships and logic that was generated using the compiler 1712. The computer 1702 also optionally comprises an external communication device such as a modem, satellite link, Ethernet card, or other device for communicating with other computers.

In one embodiment, instructions implementing the operating system 1708, the computer program 1710, and the compiler 1712 are tangibly embodied in a computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of instructions which, when read and executed by the computer 1702, causes the computer 1702 to perform the operations herein described. Computer program 1710 and/or operating instructions may also be tangibly embodied in memory 1706 and/or data communications devices 1730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method comprising:
obtaining a first measure of audience engagement with a first portion of a media program, the first measure of audience engagement including a first heart rate variability (HRV) measurement;
obtaining a second measure of audience engagement with one of a second portion of the media program scheduled to follow the first portion of the media program or a second advertisement scheduled to follow the first portion of the media program;
selecting a first advertisement to precede the one of the second portion of the media program or the second advertisement from a plurality of advertisements based upon (i) the first measure of audience engagement including the first HRV measurement and (ii) the second measure of audience engagement; and
scheduling the first advertisement for a presentation in connection with the media program.

2. The method of claim 1, further comprising:
obtaining a third measure of audience engagement with the second portion of the media program or the second advertisement;
selecting a third advertisement from the plurality of advertisements based upon the second measure of audience engagement; and
scheduling the third advertisement for the presentation in connection with the media program.

3. The method of claim 2, wherein selecting the third advertisement is further based on the first measure of audience engagement.

4. The method of claim 1, wherein the first measure of audience engagement is determined according to an average audience engagement belonging to a media program type.

5. The method of claim 1, further comprising:
determining a reach of the media program;
wherein selecting the first advertisement is further based upon the reach of the media program.

6. The method of claim 1, wherein selecting the first advertisement from the plurality of advertisements is further based upon maximizing an estimated revenue derived from the media program.

7. The method of claim 6, wherein the estimated revenue comprises an estimate of revenue to an advertiser associated with the first advertisement.

8. The method of claim 1, further comprising:
obtaining a third measure of audience engagement with the first advertisement;
selecting one of a third portion of the media program or a third advertisement based upon the third measure of audience engagement with the first advertisement; and
scheduling the one of the third portion of the media program or the third advertisement for the presentation in connection with the media program.

9. The method of claim 1, further comprising:
presenting the first advertisement in connection with the media program.

10. A system comprising:
a processor configured to:
obtain a first measure of audience engagement with a first portion of a media program, the first measure of audience engagement including a first heart rate variability (HRV) measurement;
obtain a second measure of audience engagement with one of a second portion of the media program scheduled to follow the first portion of the media program or a second advertisement scheduled to follow the first portion of the media program;

select a first advertisement to precede the one of the second portion of the media program or the second advertisement from a plurality of advertisements based upon (i) the first measure of audience engagement including the first HRV measurement and (ii) the second measure of audience engagement; and schedule the first advertisement for a presentation in connection with the media program.

11. The system of claim 10, wherein the processor is further configured to:

obtain a third measure of audience engagement with the second portion of the media program or the second advertisement;

select a third advertisement from the plurality of advertisements based upon the second measure of audience engagement; and schedule the third advertisement for the presentation in connection with the media program.

12. The system of claim 11, wherein the processor is further configured to select the third advertisement based on the first measure of audience engagement.

13. The system of claim 10, wherein the processor is further configured to determine the first measure of audience engagement according to an average audience engagement belonging to a media program type.

14. The system of claim 10, wherein the processor is further configured to:

determine a reach of the media program; and select the first advertisement further based upon the reach of the media program.

15. The system of claim 10, wherein the processor is further configured to select the first advertisement from the plurality of advertisements based upon maximizing an estimated revenue derived from the media program.

16. The system of claim 15, wherein the estimated revenue comprises an estimate of revenue to an advertiser associated with the first advertisement.

17. The system of claim 10, wherein the processor is further configured to:

obtain a third measure of audience engagement with the first advertisement;

select one of a third portion of the media program or a third advertisement based upon the third measure of audience engagement with the first advertisement; and schedule the one of the third portion of the media program or the third advertisement for the presentation in connection with the media program.

18. The system of claim 10, wherein the processor is further configured to:

present the first advertisement in connection with the media program.

* * * * *